(12) United States Patent
Yamamoto et al.

(10) Patent No.: US 12,393,022 B2
(45) Date of Patent: Aug. 19, 2025

(54) OPTICAL SYSTEM AND DISPLAY APPARATUS

(71) Applicant: CANON KABUSHIKI KAISHA, Tokyo (JP)

(72) Inventors: Akira Yamamoto, Saitama (JP); Keiichiro Ishihara, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 858 days.

(21) Appl. No.: 17/548,999

(22) Filed: Dec. 13, 2021

(65) Prior Publication Data

US 2022/0187596 A1 Jun. 16, 2022

(30) Foreign Application Priority Data

Dec. 16, 2020 (JP) .................. 2020-208642

(51) Int. Cl.
*G02B 27/00* (2006.01)
*G02B 17/08* (2006.01)
*G02B 27/01* (2006.01)

(52) U.S. Cl.
CPC ..... *G02B 27/0025* (2013.01); *G02B 17/0816* (2013.01); *G02B 17/0856* (2013.01);
(Continued)

(58) Field of Classification Search
CPC .............. G02B 27/017; G02B 27/0172; G02B 2027/0178; G02B 13/08; G02B 13/12; G02B 27/01; G02B 27/217; G02B 27/00; G02B 27/0025; G02B 27/0081; G02B 27/0093; G02B 27/0178; G02B 27/09;
(Continued)

(56) References Cited

U.S. PATENT DOCUMENTS 5,745,295 A 4/1998 Takahashi
5,768,024 A 6/1998 Takahashi
(Continued)

FOREIGN PATENT DOCUMENTS

CN 1591082 A 3/2005
CN 101900872 A 12/2010
(Continued)

OTHER PUBLICATIONS

Office Action issued in Chinese Appln. No. 202111513834.9, mailed on Sep. 2, 2024. English translation provided.
(Continued)

*Primary Examiner* — Jie Lei
(74) *Attorney, Agent, or Firm* — ROSSI, KIMMS & McDOWELL LLP

(57) ABSTRACT

The present disclosure relates to optical system and display apparatus. An optical system guides a light beam from a display element to an exit pupil. The optical system includes a first optical element including a transmission surface, a reflection-transmission surface, and a reflection surface, and a negative lens including a concave surface on an exit pupil side. The light beam from the display element heads toward the exit pupil via the transmission surface, the reflection-transmission surface, the reflection surface, the reflection-transmission surface, and the negative lens in this order. A predetermined condition is satisfied.

16 Claims, 18 Drawing Sheets

(52) U.S. Cl.
CPC ......... *G02B 27/00* (2013.01); *G02B 27/0081* (2013.01); *G02B 27/0172* (2013.01)

(58) Field of Classification Search
CPC ............ G02B 27/0955; G02B 27/0972; G02B 17/08; G02B 17/0816; G02B 17/0856; G02B 17/086; G02B 2027/0123; G02B 2027/0174; G02B 25/00; G02B 25/001
USPC ............ 359/13, 629–634, 462, 466, 815; 345/7–9
See application file for complete search history.

(56) References Cited

U.S. PATENT DOCUMENTS

| | | | |
|---|---|---|---|
| 6,396,639 | B1 | 5/2002 | Togino et al. |
| 8,724,229 | B2 | 5/2014 | Takahashi |
| 9,042,025 | B2 | 5/2015 | Sato et al. |
| 9,798,124 | B2 | 10/2017 | Kondo |
| 11,448,877 | B2 | 9/2022 | Yatsu et al. |
| 2001/0048561 | A1* | 12/2001 | Heacock ............ G02B 27/0172 359/630 |
| 2008/0291531 | A1 | 11/2008 | Heimer |
| 2012/0120366 | A1 | 5/2012 | Clerc et al. |
| 2019/0162950 | A1 | 5/2019 | Lapstun |
| 2019/0278087 | A1 | 9/2019 | Cheng et al. |

FOREIGN PATENT DOCUMENTS

| | | |
|---|---|---|
| CN | 102483524 A | 5/2012 |
| CN | 103995355 A | 8/2014 |
| CN | 105137590 A | 12/2015 |
| CN | 106371204 A | 2/2017 |
| CN | 108051920 A | 5/2018 |
| CN | 110858032 A | 3/2020 |
| CN | 110869835 A | 3/2020 |
| EP | 3709069 A1 | 9/2020 |
| JP | H08146341 A | 6/1996 |
| JP | H09146037 A | 6/1997 |
| JP | 2001242412 A | 9/2001 |
| JP | 2002202456 A | 7/2002 |
| JP | 2007079031 A | 3/2007 |
| JP | 5791991 B2 | 10/2015 |
| JP | 2018136558 A * | 8/2018 ............ G02B 27/01 |
| JP | 6392066 B2 | 9/2018 |
| WO | 2013046559 A1 | 4/2013 |

OTHER PUBLICATIONS

Yang "Research on Technology of Retinal Projection Display" Xi'an Technological University. May 3, 2011: pp. 1-90. English abstract provided. Cited in NPL 1.

* cited by examiner

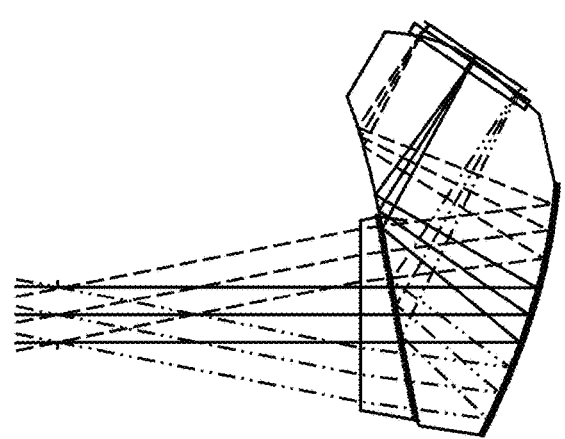
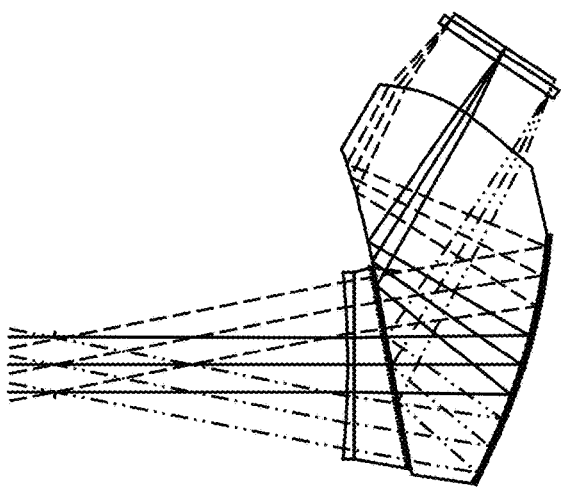
FIG. 2A  FIG. 2B
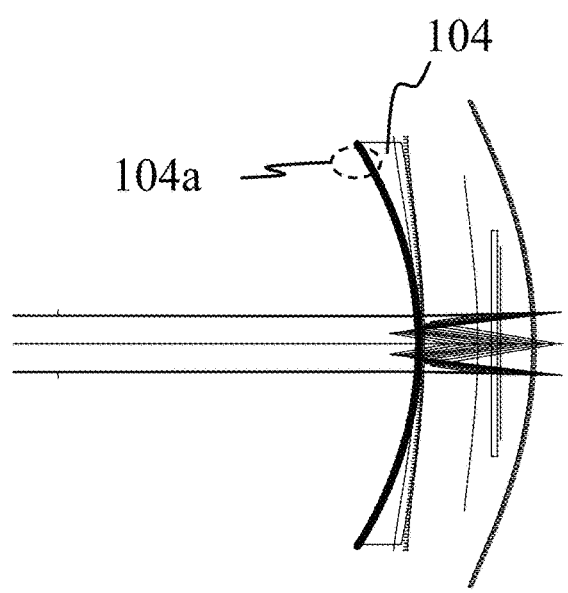
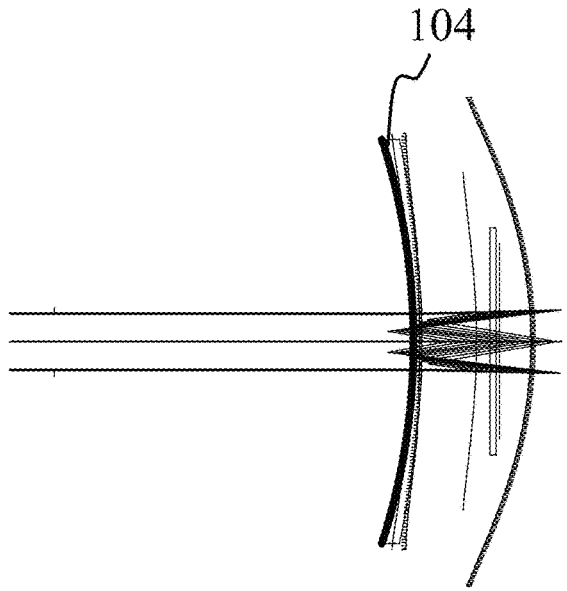
FIG. 3A  FIG. 3B

OPTICAL SYSTEM AND DISPLAY APPARATUS

BACKGROUND OF THE DISCLOSURE

Field of the Disclosure

The aspect of the embodiments relates to an optical system suitable for a display apparatus such as a head mounted display (HMD) that allows a user to view an image displayed on a display element as an enlarged virtual image.

Description of the Related Art

Conventionally, thinned optical systems (eyepiece optical systems) have been known, and an eyepiece optical system is configured by using an optical element having an entrance surface, a plurality of reflection surfaces, and an exit surface so that a principal ray of a central angle-of-view light beam is reflected a plurality of times in a decentered manner. Such an eyepiece optical system is required to have a widened observation angle of view. In order to widen the observation angle of view, Japanese Patent Nos. ("JPs") 6392066 and 5791991 disclose optical systems each having a second decentered optical element disposed between an observer and a decentered optical element.

However, it is difficult to realize both reduction of a focal length and widening of an angle of view with the optical systems disclosed in JPs 6392066 and 5791991. If the optical system disclosed in JPs 6392066 or 5791991 are made to have a short focal length so that the angle of view is widened, a distance from a principal plane on a display element side of the optical system to the display element is so short that a space cannot be ensured for disposing parts necessary for incorporating the display element and that parts configuring the optical system interfere with the display element.

SUMMARY OF THE DISCLOSURE

The present disclosure provides an optical system and a display apparatus each of which is small and has a wide angle of view.

An optical system according to one aspect of the embodiments guides a light beam from a display element to an exit pupil. The optical system includes a first optical element including a transmission surface, a reflection-transmission surface, and a reflection surface, and a negative lens including a concave surface on an exit pupil side. The light beam from the display element heads toward the exit pupil via the transmission surface, the reflection-transmission surface, the reflection surface, the reflection-transmission surface, and the negative lens in this order. A predetermined condition is satisfied.

An optical system according to one aspect of the embodiments guides a light beam from a display element to an exit pupil. The optical system includes a first optical element including a transmission surface, a reflection-transmission surface, and a reflection surface, and a negative lens including a concave surface on an exit pupil side. The reflection-transmission surface and the negative lens are adjacent to each other. The light beam from the display element heads toward the exit pupil via the transmission surface, the reflection-transmission surface, the reflection surface, the reflection-transmission surface, and the negative lens in this order. A predetermined condition is satisfied.

An optical system according to one aspect of the embodiments guides a light beam from a display element to an exit pupil. The optical system includes a first optical element including a transmission surface, a reflection-transmission surface, and a reflection surface, a negative lens including a concave surface on an exit pupil side, and a second optical element which is a prism disposed between the first optical element and the negative lens. The light beam from the display element heads toward the exit pupil via the transmission surface, the reflection-transmission surface, the reflection surface, the reflection-transmission surface, and the negative lens in this order. A predetermined condition is satisfied.

Further features of the embodiments will become apparent from the following description of exemplary embodiments with reference to the attached drawings.

BRIEF DESCRIPTION OF THE DRAWINGS

FIGS. 2A and 2B are explanatory diagrams of an eyepiece optical system according to the first embodiment.

FIGS. 3A and 3B are explanatory diagrams of physical interference between the eyepiece optical system and glasses of an observer according to the first embodiment.

DESCRIPTION OF THE EMBODIMENTS

Referring now to the accompanying drawings, a description will be given of embodiments according to the present disclosure.

In a description of each example, when an origin is an exit pupil (pupil center), and a light beam at a center of an angle of view observed by an observer (observation angle of view)

is referred to as a central angle-of-view light beam, X, Z, and Y axes of an absolute coordinate system are defined as follows. An axis that matches a principal ray of the central angle-of-view light beam is referred to as the Z axis (a straight line along the principal ray of the central angle-of-view light beam, and a direction from the exit pupil to a first plane is regarded as a positive direction), an axis formed by rotating, in a section of FIG. 1, the Z axis by 90 degrees counterclockwise around the origin is referred to as the Y axis, and an axis passing through the origin and orthogonal to the Z axis and the Y axis is referred to as the X axis.

First Embodiment

Figure 1:
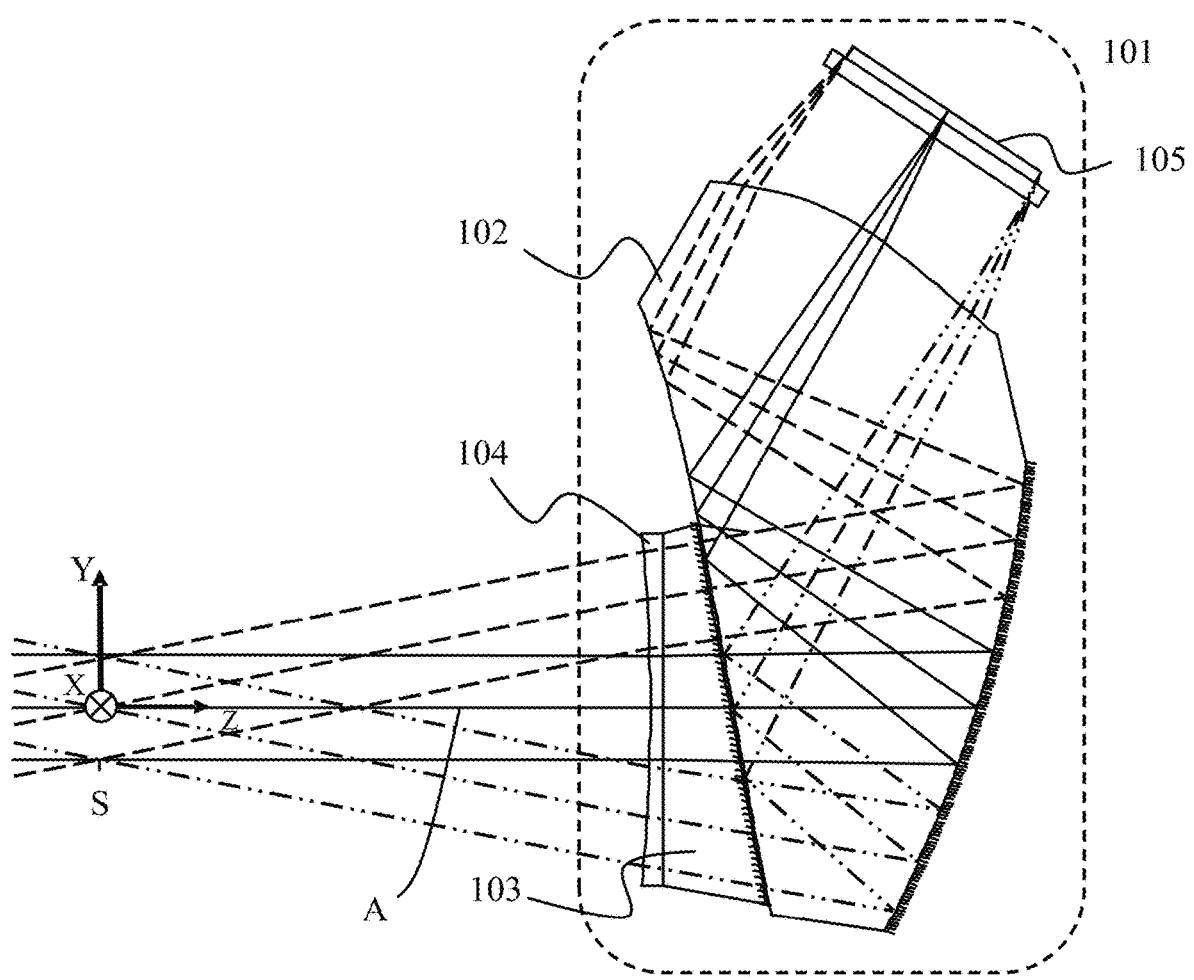
FIG. 1 is a configuration diagram illustrating a display apparatus according to a first embodiment.
Figure 12:
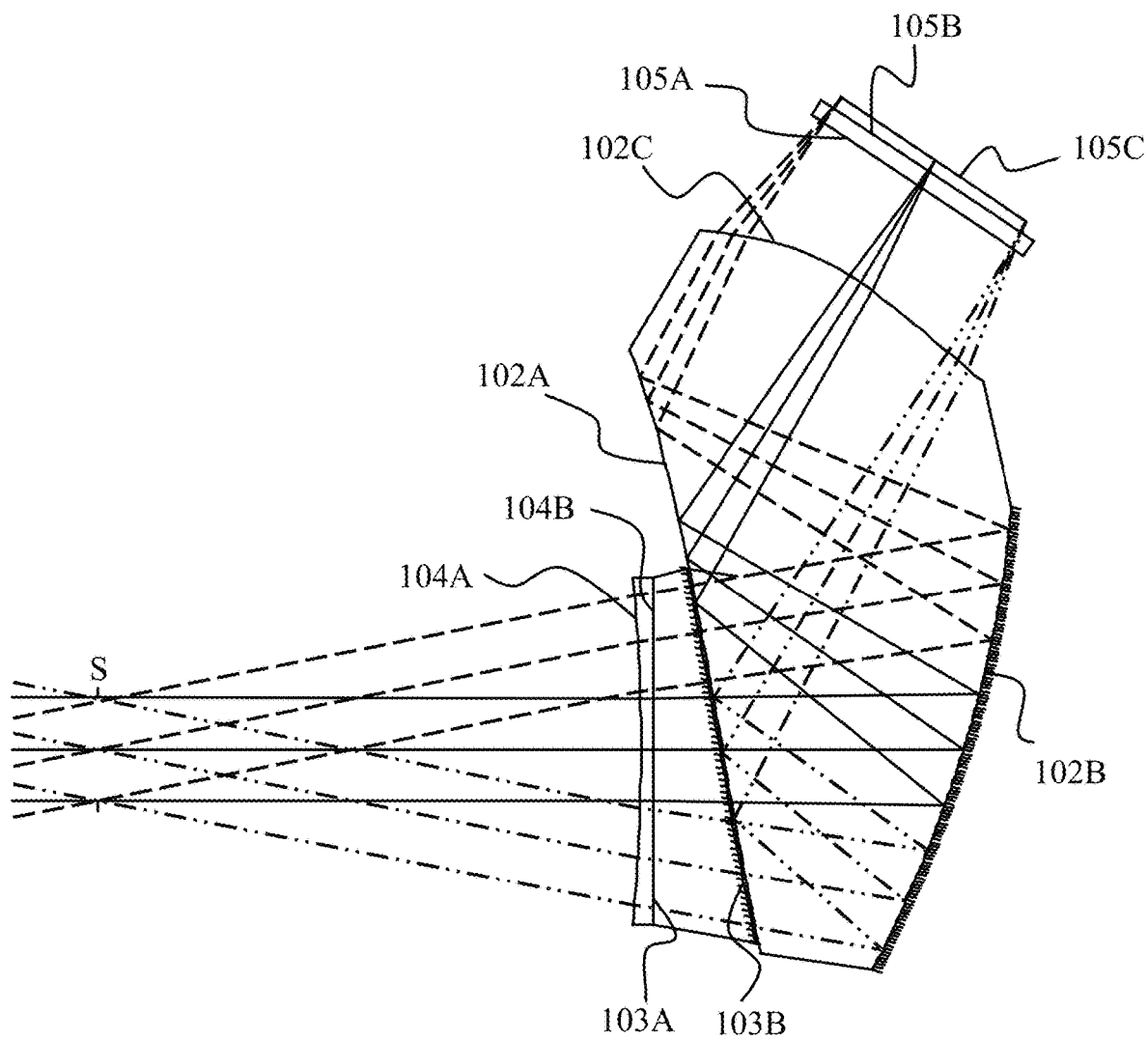
FIG. 12 is an explanatory diagram of a Numerical Example 1.

First, a description will be given of an eyepiece optical system and a display apparatus according to a first embodiment of the present disclosure with reference to FIGS. 1 and 12. FIG. 1 is a configuration diagram illustrating the display apparatus including the eyepiece optical system in this embodiment. FIG. 12 is an explanatory diagram of a Numerical Example 1 corresponding to this embodiment. A reference numeral 101 denotes an image-a display apparatus, which will be also referred to as an observation apparatus or an image display apparatus. The image display apparatus 101 includes the eyepiece optical system as an optical system, and an image display element 105 as a display element. The eyepiece optical system is configured to guide a light beam from the image display element 105 to an exit pupil S.

A reference numeral 102 denotes a first optical element. The first optical element 102 has a transmission surface 102C as an entrance surface, a reflection-transmission surface 102A, and a reflection surface 102B, and the inside the first optical element 102 is filled with medium having a refractive index of n>1. A reference numeral 103 denotes a second optical element, which is a prism, having two transmission surfaces 103B and 103A which of refraction surfaces. A reference numeral 104 denotes a concave lens which is a negative lens. The concave lens 104 is disposed between the first optical element 102 and the exit pupil S, and has a concave surface on the exit pupil S side. In this embodiment, the eyepiece optical system includes three optical elements of the first optical element 102, the second optical element 103, and the concave lens 104. In this embodiment, the display apparatus 101 includes the eyepiece optical system and the image display element 105. The light beam from the image display element 105 forms an exit pupil S via the first optical element 102 and the concave lens 104. That is, the light beam from the image display element 105 heads to the exit pupil S via the transmission surface 102C as the entrance surface, the reflection-transmission surface 102A, the reflection surface 102B, and the reflection-transmission surface 102A of the first optical element 102, and the concave lens 104 in this order.

A description will be given of a path of ray inside each optical element. Light emitted from an image displayed on the image display element 105 enters the first optical element 102 from the transmission surface 102C as the entrance surface of the first optical element. The light having entered the first optical element 102 is totally reflected by the reflection-transmission surface 102A and reflected by the reflection surface 102B so that an optical path in the first optical element 102 is folded. Thereafter, the first optical element 102 emits the light from the reflection-transmission surface 102A. The light emitted from the first optical element 102 passes through the transmission surfaces 103B and 103A of the second optical element 103 and enters the concave lens 104. After the light is emitted from the concave lens 104, the light is guided to the exit pupil S of the eyepiece optical system, and the image displayed on the image display element 105 is viewed as a far enlarged virtual image through the exit pupil S by an observer who places a pupil near the exit pupil S.

Like a surface of a second optical element disclosed in JP 6392066, the transmission surface 103B as the refraction surface of the second optical element 103 has a function of cancelling refraction that occurs when light passes through the reflection-transmission surface 102A. Thereby, aberration occurring on the reflection-transmission surface 102A can be canceled. The reflection-transmission surface 102A and the transmission surface 103B as the refraction surface may have the same shape, and the second optical element 103 may be made of the same material as the first optical element 102. The first optical element 102 and the second optical element 103 may be made of optical resin, and the reason thereof will be described later. The reflection-transmission surface 102A and the transmission surface 103B as the refraction surface may have the same shape, but the shape is not limited to this as long as the transmission surface 103B has a shape capable of canceling the aberration occurring when light is transmitted through the reflection-transmission surface 102A.

Next, a description will be given of features of the eyepiece optical system according to this embodiment with reference to FIGS. 2A and 2B. FIGS. 2A and 2B are explanatory diagrams of the eyepiece optical system according to this embodiment. When the angle of view of the eyepiece optical system is to be increased, a focal length of the eyepiece optical system is shortened. A distance, i.e., an eye relief, from the exit pupil S to a final surface of the eyepiece optical system is set to a value of about 15 to 30 mm so that the observer can easily perform observation. However, if a wide angle of view is to be obtained when the image display element 105 is small, the focal length of the eyepiece optical system becomes shorter than the eye relief. The size of the first optical element 102 is determined approximately from the eye relief and the angle of view. That is, the longer the eye relief, the larger the first optical element 102. If the focal length of the eyepiece optical system is shortened by increasing the size of the first optical element 102, a focal plane of the eyepiece optical system is brought closer to the transmission surface 102C as the entrance surface.

In a case where a mechanical part is disposed between the image display element 105 and the first optical element 102, or in a case where the image display element 105 is, for example, an electroluminescence and releases heat, a certain distance or more is to be ensured between the first optical element 102 and the image display element 105. However, if the focal plane of the eyepiece optical system is close to the first optical element 102, a distance, i.e., a back focus, between the first optical element 102 and the image display element 105 is small, for example, as illustrated in FIG. 2A. As a result, sufficient space may not be ensured and the elements may collide with each other.

In order that these problems are prevented, a position of an image side principal plane of the eyepiece optical system is shifted to a position closer to the image display element 105 and the focal plane is shifted away from the first optical element 102. As one of methods to shift the image side principal plane, JP 6392066 discloses a technique of inserting the second optical element including a surface having a negative optical power (refractive power) between the exit pupil S and a prism corresponding to the first optical element

102. The second optical element 103 is disposed between the exit pupil S and the first optical element 102 so that the focal length of the entire eyepiece optical system is reduced, and the position of the image side principal plane is shifted to a position closer to the image display element. Thereby, a sufficient space can be ensured between the image display element 105 and the first optical element 102 (refer to FIG. 2B).

In order that the observation angle of view is made wider than that of the configuration of JP 6392066 and that the focal length of the eyepiece optical system is further reduced, the position of the principal plane is further shifted. For this purpose, the concave lens 104 is made to have an increased negative refractive power and a large curvature. However, if the curvature is too large, a sag amount of the concave lens 104 is so large that an edge of the concave lens 104 greatly protrudes to the exit pupil side. At this time, for example, when an observer wearing glasses views into the eyepiece optical system, the glasses hit an edge portion 104a of the concave lens 104 as illustrated in FIG. 3A. FIG. 3A is an explanatory diagram of physical interference between the eyepiece optical system and the observer's glasses in a case where the sag amount of the concave lens 104 is large.

For hindering the physical interference from occurring, this embodiment increases a refractive index of the concave lens 104. When the refractive index increases, the negative optical power can be increased while the curvature of the concave lens 104 is kept small. As a result, as illustrated in FIG. 3B, the sag amount of the concave lens 104 can be reduced, and a sufficient eye relief can be ensured even around the edge of the concave lens 104. FIG. 3B is an explanatory diagram of the physical interference between the eyepiece optical system and the observer's glasses in a case where the sag amount of the concave lens 104 is small. In this embodiment, the following inequality (1) is satisfied where $n_n$ represents a refractive index of the concave lens 104 at a d-line (d-line of Fraunhofer line, that is, a wavelength of 587.56 nm), and $n_m$ represents a refractive index of the first optical element 102 at the d-line.

$$n_n > n_m \quad (1)$$

The refractive indexes $n_n$ and $n_m$ may satisfy the following inequality (2).

$$n_n/n_m > 1.05 \quad (2)$$

This embodiment lets $n_n = 1.854$ and $n_m = 1.531$. By increasing the refractive index of the concave lens 104 in this way, this embodiment realizes the eyepiece optical system having a wide-angle of view of 45° while using an image display element of the size (0.7 inch) similar to that in JP 6392066. At this time, the focal length of the concave lens 104 is −81.5 mm which indicates a stronger negative power than a negative power of the concave lens of JP 6392066 having the focal length of −94.3 mm.

In order that a back focus is increased by moving the image side principal plane of the eyepiece optical system, the image plane is shifted by at least several mm. This amount of shift requires that an optical power of the concave lens is larger than the optical power of the eyepiece optical system by a certain amount. In this embodiment, the following inequality (3) may be satisfied where $\varphi_n$ represents the optical power of the concave lens 104 and $\varphi_A$ represents the optical power of the eyepiece optical system.

$$\varphi_n/\varphi_A < -0.05 \quad (3)$$

In order that a sufficient amount of image plane shift is further ensured, the numerical range of the inequality (3) may be set to a numerical range of the following inequality (4).

$$\varphi_n/\varphi_A < -0.08 \quad (4)$$

When the inequality (4) is satisfied, the image plane can be sufficiently shifted and a sufficient distance between the first optical element 102 and the image display element 105 can be ensured. This embodiment lets $\varphi_n/\varphi_A = -0.26$. By making the concave lens 104 have the negative optical power of sufficient strength in this way, this embodiment realizes shift of the image plane of about 5 mm.

The concave lens 104 is disposed so that its strong concave surface faces a pupil side. Thereby, an occurrence of aberration caused by the concave lens 104 is reduced by making an arrangement closer to a concentric arrangement with the pupil centered. As compared with a case where the concave lens 104 is disposed in an opposite way, the arrangement of this embodiment has an effect of reducing a distance between the first optical element 102 and the concave lens 104 by the sag amount of the concave lens 104 and making the optical system small.

Each optical surface of the first optical element 102 often uses a non-rotational symmetric surface, i.e., a free-form surface, so as to reduce an effect of a ray obliquely entering. When an optical system uses such a free-form surface, the first optical element 102 is often manufactured by molding using optical resin because this manufacturing is easy and cost can be reduced. The optical resin to be used is, for example, acrylic resin, polycarbonate resin, cycloolefin polymer resin or the like. In this embodiment, the same optical material is used for the second optical element 103. Thereby, the aberration generated on the reflection-transmission surface 102A of the first optical element 102 can be canceled by the transmission surface 103B which is the entrance surface of the second optical element, the two surfaces having the same shape and being made of the same material. The molding using the resin can make it possible to manufacture optical elements with complicated shapes, but materials may cause corrosion and expansion due to vulnerability to oil and moisture and may be easily scratched due to its softness. For solving these problems, there are measures such as arranging a protective glass window and applying a protective coating to a resin surface, but these measures cause an increase in the number of parts and processes.

In this embodiment, the concave lens 104 is made of optical glass (glass material). As compared to resin materials, the optical glass is very hard and stable, has high environmental resistance, and is resistant to scratches, and therefore the optical glass can be used to protect resin materials. That is, when the concave lens 104 is made of the optical glass, the concave lens can also function as a protective window for the first optical element. Further, when the optical glass is used, it is easy to select a refractive index and a dispersion, and to give a proper optical power to the concave lens 104.

In this embodiment, when $\nu_n$ represents an Abbe number of the concave lens 104 and $\nu_m$ represents an Abbe number of the first optical element 102, the following inequality (5) may be satisfied.

$$15 < \nu_n \nu_m \quad (5)$$

The Abbe number is calculated by the following equation where nd, nF, and nC represent refractive indexes at the d-line (wavelength 587.6 nm), an F-line (wavelength 486.1 nm), and a C-line (wavelength 656.3 nm) of the Fraunhofer lines, respectively.

$$v=(nd-1)/(nF-nC)$$

In this embodiment, the following inequality (6) may be satisfied where no represents a refractive index of the second optical element 103 at the d-line.

$$n_n > n_O \tag{6}$$

In this embodiment, the optical system is an eyepiece optical system, but the optical system may be, for example, an image pickup optical system in which an image sensor is disposed at the position of the image display element 105 and a diaphragm is disposed at a position corresponding to the position of the exit pupil S. In this case, the optical system is a front-aperture image pickup optical system, and can be applied to, for example, a fundus camera.

Second Embodiment

Figure 4:
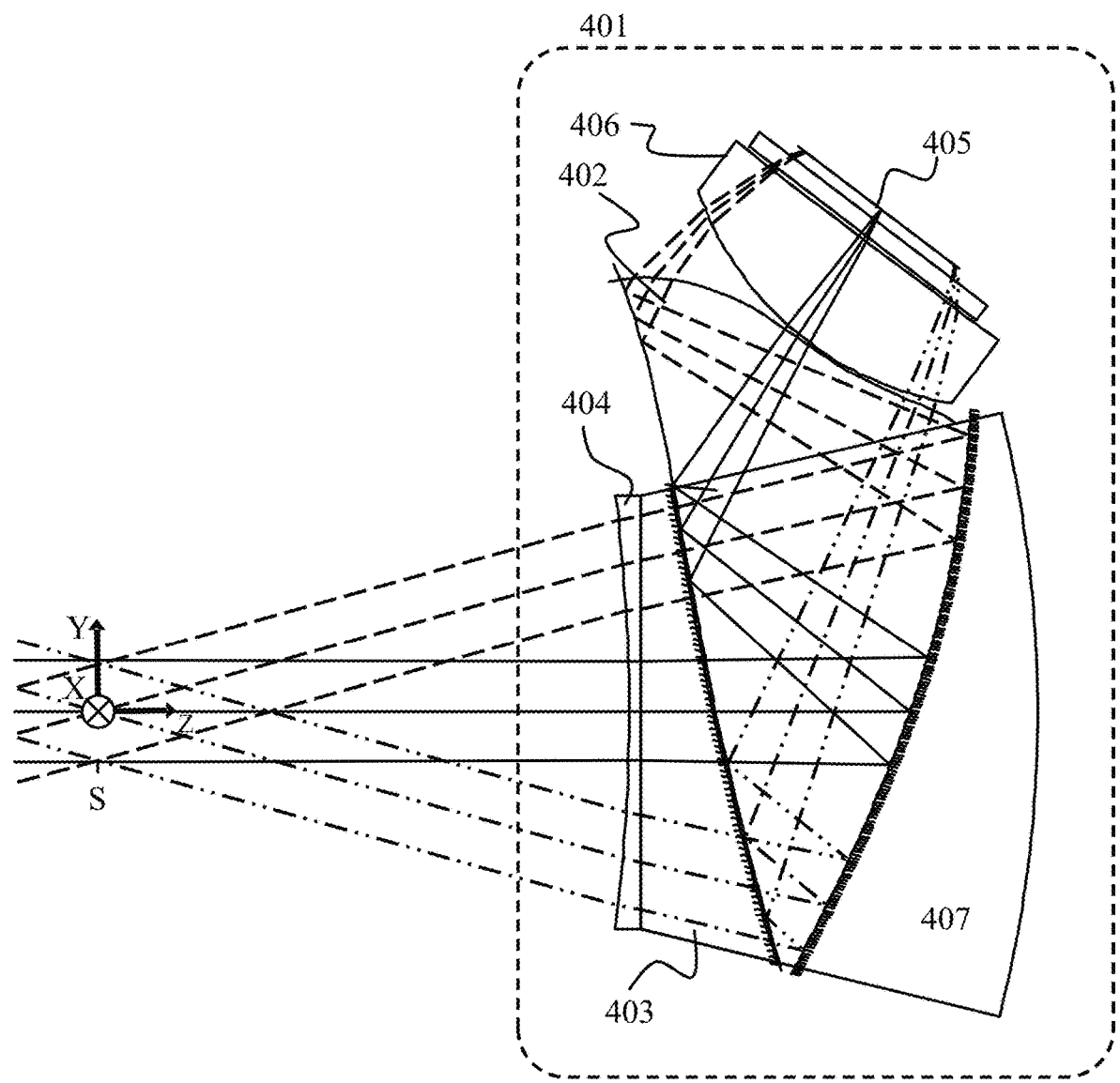
FIG. 4 is a configuration diagram illustrating a display apparatus according to a second embodiment.
Figure 14:
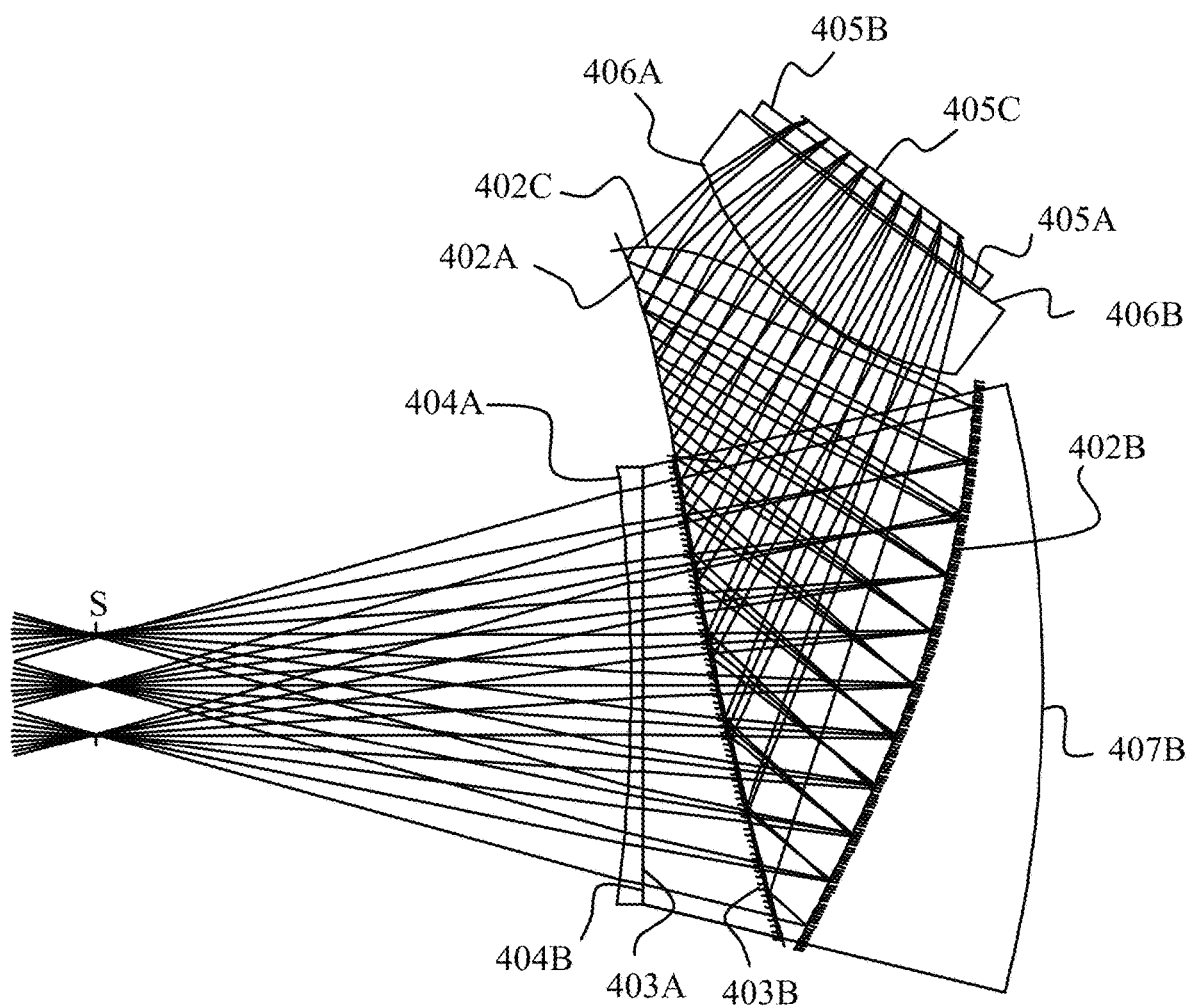
FIG. 14 is an explanatory diagram of a Numerical Example 2.

Next, a description will be given of an eyepiece optical system and a display apparatus according to a second embodiment of the present disclosure with reference to FIGS. 4 and 14. FIG. 4 is a configuration diagram of a display apparatus having an eyepiece optical system in this embodiment. FIG. 14 is an explanatory diagram of a Numerical Example 2 corresponding to this embodiment. An image display apparatus 401 as a display apparatus includes an eyepiece optical system as an optical system and an image display element 405 as a display element. The eyepiece optical system is configured to guide a light beam from the image display element 405 to an exit pupil S.

The eyepiece optical system according to this embodiment includes a convex lens 406 of a positive lens disposed between a first optical element 402 and the image display element 405. The convex lens 406 has a strong convex surface 406A having a shape convex to the first optical element 402. When a direction orthogonal to a plane on which the exit pupil S is formed is referred to as a first direction, inside the convex lens 406, a length of an optical path of a light beam passing through a position closest to a reflection surface 402B in the first direction is longer than a length of an optical path of a light beam passing through a position closest to a reflection-transmission surface 402A in the first direction. That is, a length of an optical path of an outermost off-axis light beam (light beam from an edge of a display surface) closest to the reflection surface in the Z-axis direction is longer than a length of an optical path of an outermost off-axis light beam closest to the reflection-transmission surface in the Z-axis direction. This embodiment can realize a wider angle of view (50°) while using a smaller image display element (0.5 inch) than those in the first embodiment. In addition, an observer can superimpose a transmission image and a display image for observation.

Light emitted from an image displayed on the image display element 405 passes through the convex lens 406, enters the first optical element 402, exits the first optical element 402 after being reflected a plurality of times by internal surfaces, and enters the second optical element 403. After exiting the second optical element 403, the light beam enters the concave lens 404. After the light beam is emitted from the concave lens 404, the light beam is guided to the exit pupil S of the eyepiece optical system, and the image displayed on the image display element 405 is viewed as a far enlarged virtual image through the exit pupil S by the observer who places a pupil near the exit pupil S.

A third optical element 407 is disposed on a side of the first optical element 402, the side being opposite to the exit pupil S. When a reflectance of the reflection surface 402B of the first optical element 402 is set lower than 100%, the observer who places the pupil near the exit pupil S can also view an image of outside, which will be also referred to as an outside image, via the concave lens 404, the second optical element 403, the first optical element 402, and the third optical element 407. That is, the observer can simultaneously observe the outside image and the image displayed on the image display element 405.

Figure 5:
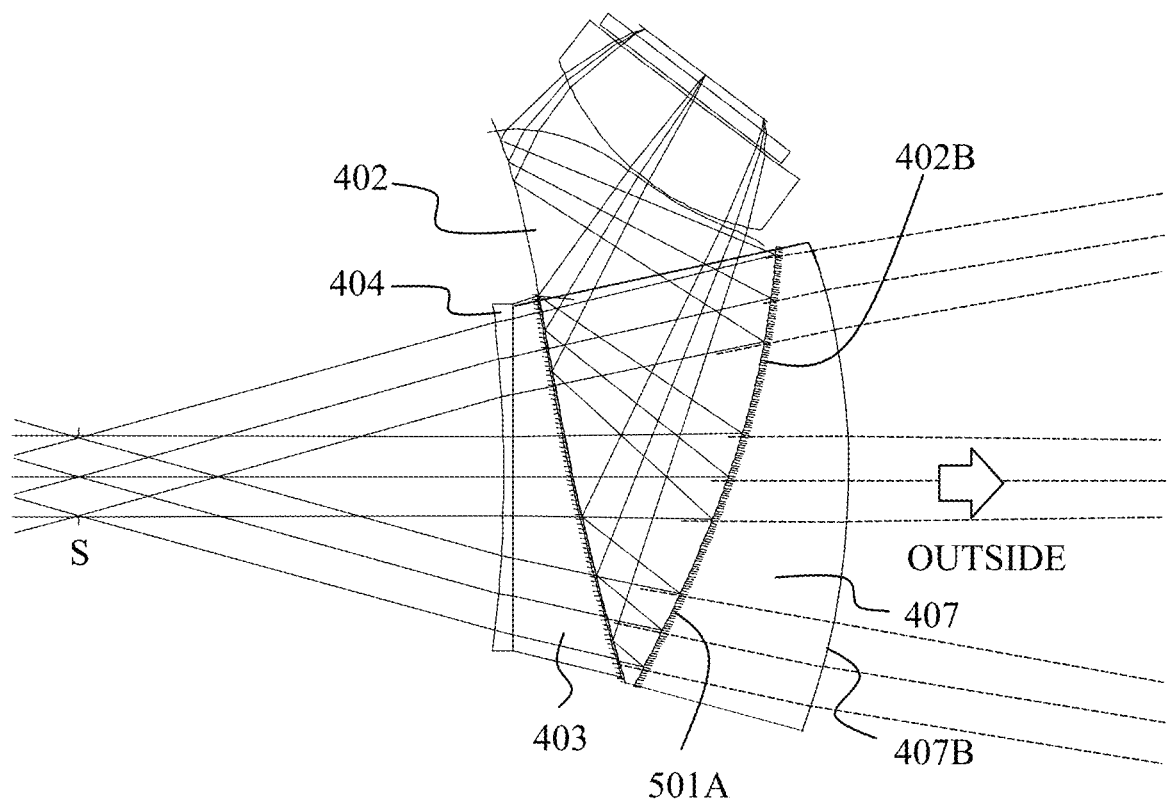
FIG. 5 is an explanatory diagram of an eyepiece optical system according to the second embodiment.

FIG. 5 is an explanatory diagram of the eyepiece optical system and illustrates an arrangement of the third optical element 407. As illustrated in FIG. 5, the reflectance of the reflection surface 402B of the first optical element is lowered (for example, reflectance of 50%), and the third optical element 407 is added. This allows the observer placing the pupil near the exit pupil S of the eyepiece optical system to observe the outside image via the concave lens 404, the second optical element 403, the first optical element 402, and the third optical element 407. An outer surface 407B of the third optical element 407 has a positive optical power, cancels almost negative optical power of the concave lens 404, and makes a total optical power of the third optical element 407 and the concave lens 404 a non-power or a very weak optical power, which allows observation of the outside image.

In a case where the optical power of the concave lens 404 is very strong, the optical power of the surface 407B of the third optical element 407 is also strong so that the outside image is observed. If the first optical element 402 and the third optical element 407 are made of different materials, aberration such as chromatic aberration and astigmatism occur at an interface 501A of the two optical elements, making it difficult to observe the outside image. Hence, the third optical element 407 may be made of the same material as the first optical element 402. As described in the first embodiment, the first optical element 402 is made of the same material as the second optical element 403, and thus a refractive index of the third optical element 407 is lower than a refractive index of the concave lens 404. Therefore, if the optical power of the concave lens 404 is too strong, the optical power to be given to the surface 407B of the third optical element is even stronger, and as a result, the surface 407B having a very large curvature is required. If the curvature is too large, the surface 407B has a hemispheroidal shape and not only cannot configure the third optical element 407 as an optical element but also causes so large aberration in the observation of the outside image, making it difficult to observe the outside image.

Hence, a restriction is given to the optical power of the concave lens 404 as expressed by the following inequality (7).

$$-0.4 < \varphi_n/\varphi_A \tag{7}$$

In the inequality (7), $\varphi_n$ represents the optical power of the concave lens 404, and $\varphi_A$ represents an optical power of the entire eyepiece optical system of the display apparatus 401. If the value is lower than the lower limit of the inequality (7), the optical power of the surface 407B is too strong, making it difficult to observe the outside image. On the other hand, if the value of the inequality (7) is too large, the optical power of the concave lens 404 is insufficient, and a distance between the image display element 405 and the convex lens 406 is so small that it is difficult to dispose the image display element 405. Based on the inequality (7) and the inequality (3) in the first embodiment, the following inequality (8) may be satisfied.

$$-0.40 < \varphi_n/\varphi_A < -0.05 \quad (8)$$

When such a condition of the inequality (8) is satisfied, a position of an image plane can be sufficiently shifted and the outside can be easily observed. When the numerical range of the inequality (8) is set as a numerical range of the following inequality (9), it is easier to ensure both the shift of the image plane and the observation of the outside.

$$-0.35 < \varphi_n/\varphi_A < -0.08 \quad (9)$$

This embodiment lets $\varphi_n/\varphi_A = -0.17$. Here, a description will be given of a relationship between the refractive index of the concave lens 404 and a refractive index of the second optical element 403. As described in the first embodiment, the refractive index of the concave lens 404 is increased so that a negative optical power is acquired, which is larger than a negative optical power acquired by giving a negative optical power on the second optical element 403, and that the position of the image side principal plane greatly shifts. This negative optical power is generated at an interface between an exit surface 404A of the concave lens 404 and air, and therefore when $(n_n-1)$ is sufficiently larger than $(n_O-1)$, the convex lens 406 and the image display element 405 can be away from each other. Thus, the following inequality (10) may be satisfied.

$$(n_n-1)/(n_O-1) > 1.3 \quad (10)$$

If the value is lower than the lower limit of the inequality (10), the optical power of the concave lens 404 is insufficient and the image display element 405 interferes with the convex lens 406. By setting the numerical range of the inequality (10) to a numerical range of the following inequality (11), the interference between the image display element 405 and the convex lens 406 can be more easily hindered.

$$(n_n-1)/(n_O-1) > 1.4 \quad (11)$$

In the eyepiece optical system of this embodiment, the position of the image plane is shifted by about 5 mm by inserting the concave lens 404. This embodiment lets $(n_n-1)/(n_O-1)=1.59$.

Figure 6:
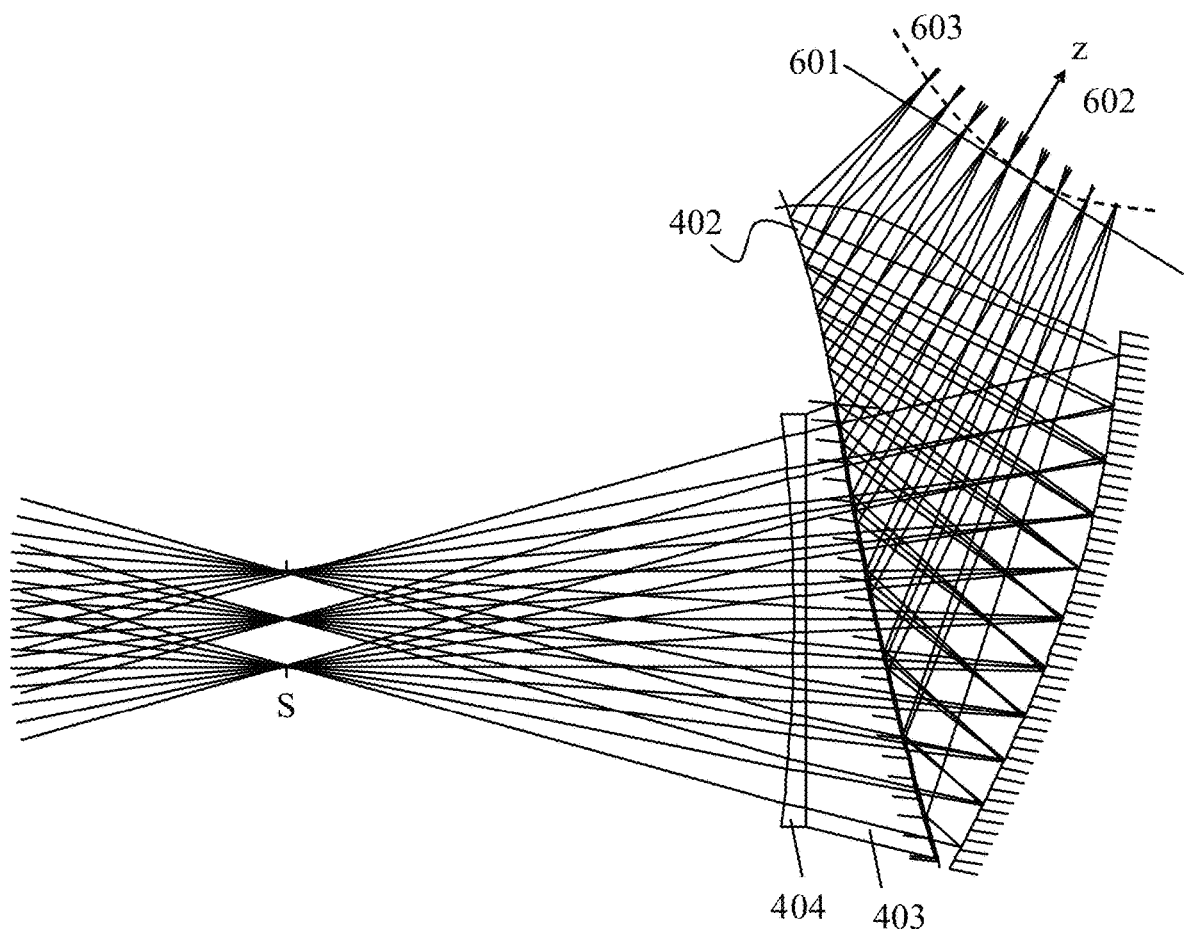
FIG. 6 is an explanatory diagram of field curvature according to the second embodiment.

FIG. 6 is an explanatory diagram of field curvature occurring in the first optical element 402 and the concave lens 404 in the eyepiece optical system of this embodiment. An imaging plane 601 is disposed near a position where the light beam passing through the exit pupil S is imaged by the concave lens 404 and the first optical element 402, and respective points are calculated where marginal rays passing through an edge of the exit pupil S intersects at a central angle of view and a marginal angle of view. When an axis 602 is set in a normal direction of the imaging plane 601, coordinate values of the axis 602 at the intersections are in a relationship of the marginal angle of view>the central angle of view. That is, the image plane 603 imaged by the first optical element 402 and the concave lens 404 is in a state of over correction.

This field curvature is caused as will be described. In the optical system of this embodiment, an eye relief is about 21 mm. This value is longer than the focal length (13.5 mm) of the eyepiece optical system, and thus the reflection surface 402B of the first optical element 402 is large. When the reflection surface 402B is large, a sag of the reflection surface 402B is large, and a sag amount causes field curvature. Therefore, although the optical system has a positive power, a negative field curvature occurs.

For correction of this field curvature, there is a method of using an element having a strong positive optical power and performing correction using a sag amount of the element. As a surface to which a positive optical power is given, a transmission surface 402C as an entrance surface of the first optical element 402 can be considered to be used. However, when the observation angle of view is widened, in a path of a ray traced from the exit pupil S side, a light beam at the marginal angle of view is totally reflected on the transmission surface 402C as the entrance surface, making it impossible to observe an image. Therefore, a strong positive power may not be given to the transmission surface 402C as the entrance surface of the first optical element 402.

Thus, as the positive power, the convex lens 406 is disposed between the first optical element 402 and the image display element 405. The convex lens is disposed so that the convex surface 406A having a strong positive power faces the first optical element 402. This makes it possible to observe an image while the total reflection does not occur on the transmission surface 402C even when the angle of view is made wider.

Correction is performed by using an optical path difference acquired by a sag amount of the transmission surfaces of the convex lens 406 with respect to a sag amount of the reflection surface 402B, and thus a strong curvature is given on the convex surface 406A having a positive power of the convex lens 406. The following inequality (12) is satisfied where $R_B$ represents a curvature radius of the reflection surface 402B at an intersection with a principal ray of the central angle-of-view light beam, which is a line along the Z axis connecting a center of the image and a center of the exit pupil S, and $R_P$ represents a curvature radius of the convex surface 406A of the convex lens 406 facing the first optical element 402.

$$-8.0 < R_B/R_P < -2.0 \quad (12)$$

The numerical range of the inequality (12) may be set as a numerical range of the following inequality (13).

$$-5.0 < R_B/R_P < -1.5 \quad (13)$$

By setting the curvature radius in this way, the field curvature generated by the concave lens 404 and the first optical element 402 can be corrected. This embodiment lets $R_B/R_P = -3.68$.

The field curvature can be corrected by disposing the convex lens 406, but chromatic aberration occurs because the strong positive power is given. In order that this chromatic aberration is corrected, it is conceivable to divide the convex lens 406 to form an achromatic lens, or to perform correction by properly setting the refractive index and dispersion of the concave lens 404.

Generally, a correction condition of chromatic aberration is expressed as the following equation (14).

$$\frac{\varphi_n}{\nu_n} h_n^2 + \frac{\varphi_p}{\nu_p} h_p^2 = 0 \quad (14)$$

Here, $\varphi_n$ represents the optical power of the concave lens 404, $\varphi_p$ represents an optical power of the convex lens 406, $\nu_n$ represents an Abbe number of the concave lens 404, and $\nu_p$ represents an Abbe number of the convex lens 406. When a light beam passing through the center of the top, bottom, left and right of the angle of view when the observer performs observation is referred to as a central angle-of-view light beam, $h_n$ and $h_p$ represent light beam radii of the central angle-of-view light beam on the concave lens 404 and on the convex lens 406. Here, chromatic aberration caused by the first optical element 402 is negligible as the chromatic aberration is small.

When the concave lens 404 and the convex lens 406 are adjacent to each other, values of the $h_n$ and $h_p$ of the equation (14) are substantially same. Thus, the absolute values of $\varphi_n/v_n$ and $\varphi_p/v_p$ are substantially same, and a value of $\varphi_n$ is large. However, a large amount of positive power is used in field curvature correction, and if the power of the concave lens also increases, a field curvature correction effect is reduced.

On the other hand, in this embodiment, the concave lens 404 and the convex lens 406 are arranged apart from each other, and the light beam diameters on the lenses are several times different. Specifically, on the concave lens 404, the light beam has a large light beam diameter because the concave lens 404 is close to the pupil, and on the convex lens 406, the light beam is thin because the convex lens 406 is close to the imaging plane.

Since the light beam radius $h_n$ on the concave lens 404 is larger than the light beam radius $h_p$ on the convex lens 406, when the equation (14) is satisfied, the optical power of the concave lens 404 can be reduced. As described in the first embodiment, it is difficult to reduce a curvature radius of the concave lens 404 and to increase the optical power of the concave lens 404. However, since the light beam diameter on the concave lens 404 is sufficiently large as described here, the concave lens 404 can have an optical power for acquiring a sufficient chromatic aberration correction effect while having a large curvature radius. The light beam diameters on the concave lens 404 and the convex lens 406 are different by about 1.5 to 3 times, and thus the following inequality (15) is satisfied.

$$\varphi_p v_n / \varphi_n v_p < -2 \tag{15}$$

Chromatic aberration can be reduced by setting the optical power and glass material of each lens so that a relationship of the inequality (15) is satisfied. This embodiment lets $\varphi_p=0.0631$, $\varphi_n=-0.0102$, $v_p=35.25$, $v_n=23.78$, and $(\varphi_p v_n)/(\varphi_n v_p)=-4.17$.

A transmission surface 403B as a refraction surface of the second optical element 403 has a function of cancelling refraction that occurs when light passes through the reflection-transmission surface 402A. The transmission surface 403B as the refraction surface may have the same shape as the reflection-transmission surface 402A and the second optical element 403 may be made of the same material as the first optical element 402. However, the transmission surface 403B as the refraction surface and the reflection-transmission surface 402A may not have the same shape as long as the transmission surface 403B has a shape capable of sufficiently cancelling aberration occurring when light passes through the reflection-transmission surface 402A. As a condition for canceling the aberration, the following inequality (16) is satisfied where α1 represents an angle formed by the Z axis and a surface normal of the reflection-transmission surface 402A as the exit surface of the first optical element at an intersection with a principal ray of the central angle-of-view light beam, α2 represents an angle formed by the Z axis and a surface normal of the transmission surface 403B as the refraction surface at an intersection with the principal ray of the central angle-of-view light beam.

$$|\alpha 1 - \alpha 2| < 5 \tag{16}$$

In this embodiment, since the two surfaces have the same shape, the value is $|\alpha 1 - \alpha 2|=0$.

In this embodiment, regarding the upper limit of the inequality (2), if a negative power of the third optical element 407 is too strong, an effect of aberration may not be negligible. Therefore, the following inequality (17) may be satisfied.

$$1.50 > n_n/n_m > 1.05 \tag{17}$$

The numerical range of the inequality (17) may be set to a numerical range of the following inequality (18).

$$1.40 > n_n/n_m > 1.10 \tag{18}$$

Third Embodiment

Figure 7:
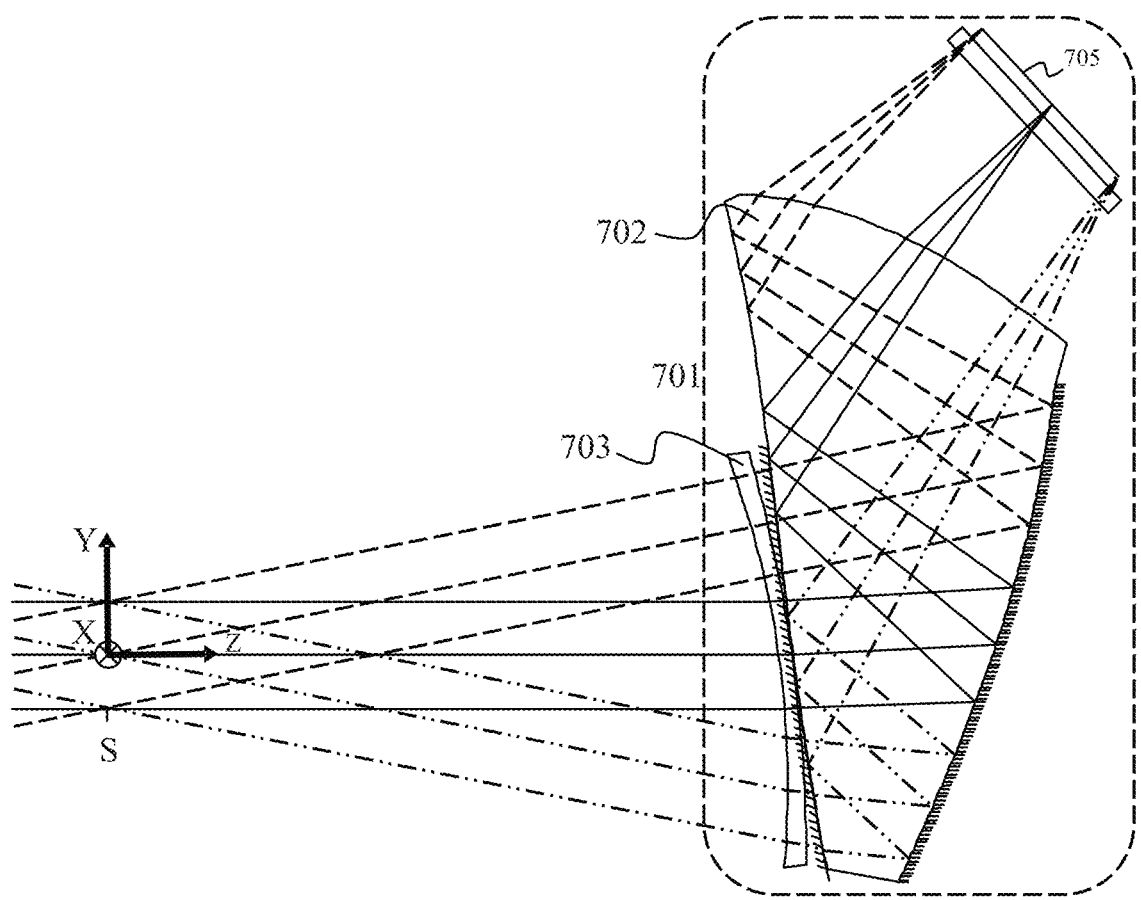
FIG. 7 is a configuration diagram illustrating a display apparatus according to a third embodiment.
Figure 16:
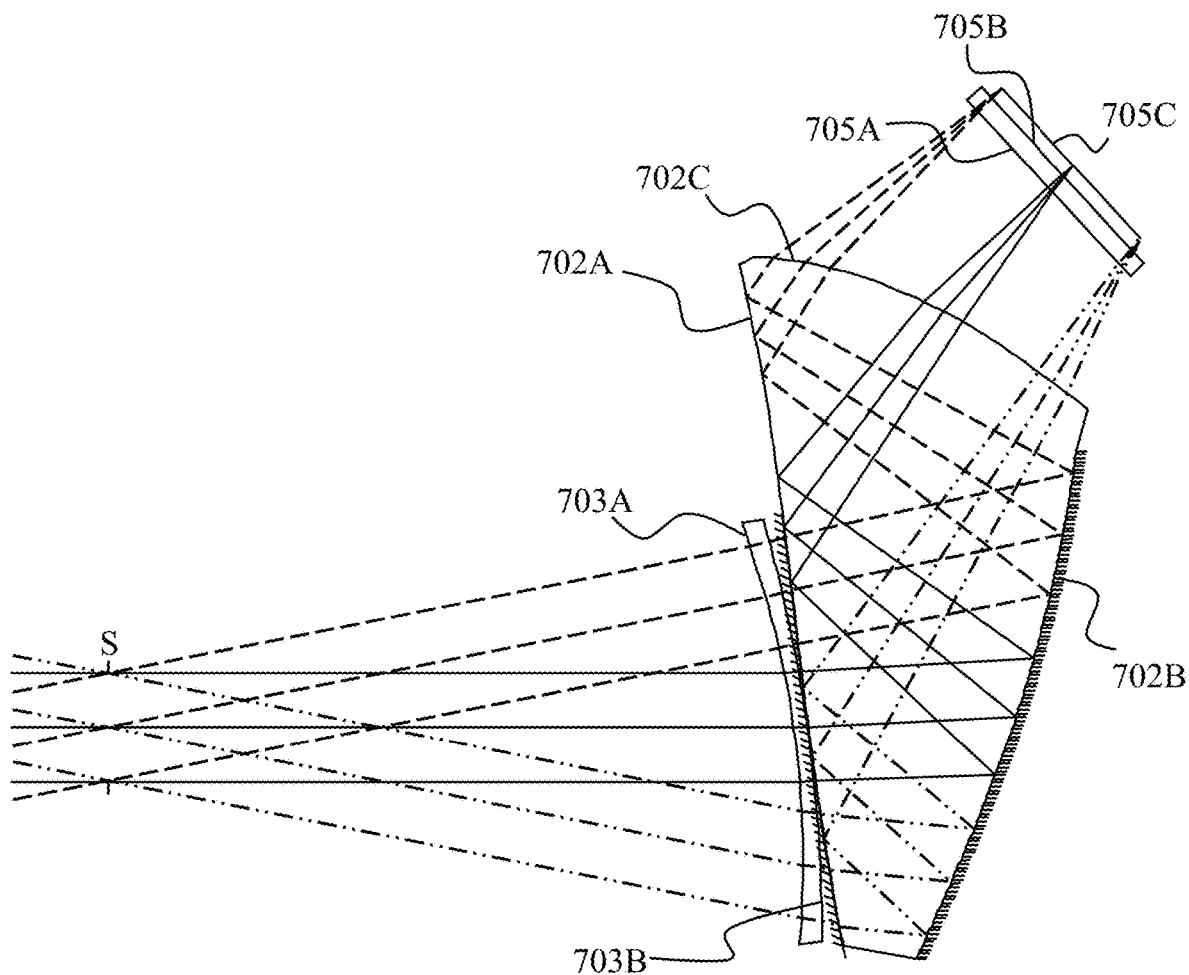
FIG. 16 is an explanatory diagram of a Numerical Example 3.

Next, a description will be given of an eyepiece optical system and a display apparatus according to a third embodiment of the present disclosure with reference to FIGS. 7 and 16. FIG. 7 is a configuration diagram illustrating the display apparatus having the eyepiece optical system in this embodiment. FIG. 16 is an explanatory diagram of a Numerical Example 3 corresponding to this embodiment. The image display apparatus 701 as a display apparatus includes an eyepiece optical system as an optical system and an image display element 705, as a display element. The eyepiece optical system is configured to guide a light beam from the image display element 705 to an exit pupil S.

This embodiment removes the second optical element from the eyepiece optical system of the first embodiment so as to bring a position of a reflection surface of the first optical element 702 closer to a position of the exit pupil S and to reduce a size of the first optical element 702. With such a configuration, even when a size of the image display element 705 is reduced, a wide angle of view can be realized while an optical power of the concave lens 703 is not substantially changed.

Light emitted from an image displayed on the image display element 705 enters the first optical element 702, exits the first optical element 702 after being reflected a plurality of times inside, and enters the concave lens 703. After the light exits the concave lens 703, the light is guided to an exit pupil S of the eyepiece optical system, and the image displayed on the image display element 705 is viewed as a far enlarged virtual image through the exit pupil S by the observer who places a pupil near the exit pupil S.

In this embodiment, the concave lens 703 and the first optical element 702 are adjacent to each other. That is, it can be said that the first optical element 702 is brought closer to the pupil while a length of an eye relief is maintained. Thereby, a size of the first optical element 702 is reduced, and as a result, a distance from an image side principal plane of the eyepiece optical system to a transmission surface 702C as an entrance surface of the first optical element is also reduced, making it possible to easily ensure a back focus.

On the other hand, if a distance between the concave lens 703 and a reflection surface 702B of the first optical element is large, the size of the first optical element 702 is large, and an effect of removal of the second optical element cannot be acquired. Therefore, a distance between an exit surface 703A of the concave lens 703 and the reflection surface 702B of the first optical element 702 satisfy the following inequality (19).

$$L_{PB}/fL < 0.75 \tag{19}$$

Here, when a direction of a principal ray of the central angle-of-view light beam in the exit pupil S is referred to as a Z-axis, $L_{PB}$ represents a distance on the Z-axis between the exit surface 703A of the concave lens 703 and the reflection surface 702B of the first optical element 702, and fL represents a focal length of the eyepiece optical system. As described above, the concave lens 703 and the first optical element 702 are adjacent to each other and the reflection surface 702B is brought closer to the exit pupil S so that a wide angle of view is realized while the optical power of the concave lens 703 is slightly weakened. This embodiment lets $L_{PB}$=8.0 mm, fL=16.2 mm, and $L_{PB}$/fL=0.49.

A focal length of the concave lens 703 is substantially the same as a focal length of −94.3 mm of a negative surface of the first embodiment of JP 6392066. By using such a configuration, a wide angle of view of 45° is realized while the image display element has a size of 0.6 inch that is smaller than an image display element of JP 6392066. An amount of shift of the image plane is about 4 mm.

When the concave lens 703 is made of optical glass, if the concave lens 703 has a special shape such as a shape of a free-form surface, cost may increase, and therefore the concave lens 703 may be a co-axis optical element. Hence, it is difficult for the concave lens 703 to be configured so that aberration is canceled by making an exit surface of a first optical element and a first surface of a second optical element have the same shape as described in JP 6392066. The concave lens 703 is tilted to match a reflection-transmission surface 702A as an exit surface of the first optical element 702 so that an effect of a difference in the surface shapes is reduced. Specifically, the following inequality (20) is satisfied where α1 represents an angle formed by the Z axis and a surface normal of the reflection-transmission surface 702A of the first optical element 702 at an intersection with a principal ray indicated by a line A of FIG. 1 of a central angle-of-view light beam, and α3 represents an angle formed by the Z axis and an optical axis of the concave lens 703.

$$|\alpha1-\alpha3|<5 \qquad (20)$$

When the inequality (20) is satisfied, aberration can be canceled for a light beam emitted from the first optical element 702. The optical system in this embodiment lets |α1−α3|=1.6.

Also, in the X-axis direction indicated in FIG. 7, aberration is canceled by the reflection-transmission surface 702A as the exit surface of the first optical element 702 and the concave lens 703, and the following inequality (21) is satisfied.

$$0.3<R_{AX}/R_{MX}<2.0 \qquad (21)$$

Here, $R_{AX}$ represents a curvature radius in a direction orthogonal to the plane of the figure of the first optical element 702 at the intersection of the reflection-transmission surface 702A and the principal ray of the central angle-of-view light beam, and $R_{MX}$ represents a curvature radius of the entrance surface 703B of the concave lens 703. In other words, $R_{MX}$ is the curvature radius of an entrance surface 703B which is a convex surface of the concave lens 703 in a section orthogonal to a section including the principal ray of the central angle-of-view light beam which passes through the image display element to the exit pupil S, and $R_{AX}$ is the curvature radius of the exit surface of the first optical element 702 at the intersection of the exit surface of the first optical element 702 and the principal ray of the central angle-of-view light beam in the section orthogonal to the section including the principal ray. By making the curvatures of the two surfaces closer in this way, aberration on the two surfaces is canceled. This embodiment lets $R_{AX}$=−48.8, $R_{MX}$=−67.7, and $R_{AX}/R_{MX}$=0.72. In this embodiment, the concave lens 703 is a meniscus lens, but the present disclosure is not limited to this.

Fourth Embodiment

Figure 8:
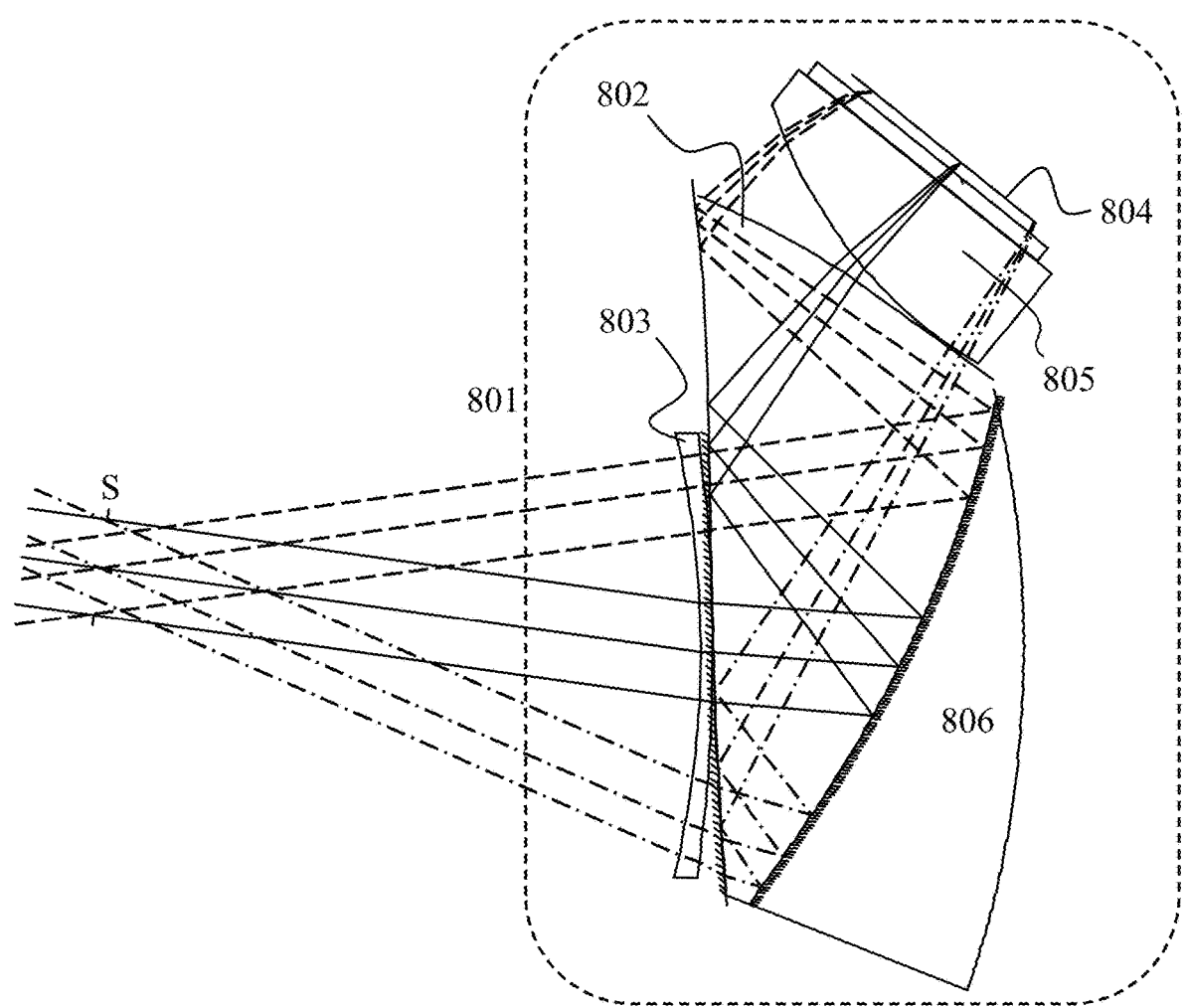
FIG. 8 is a configuration diagram illustrating a display apparatus according to a fourth embodiment.
Figure 18:
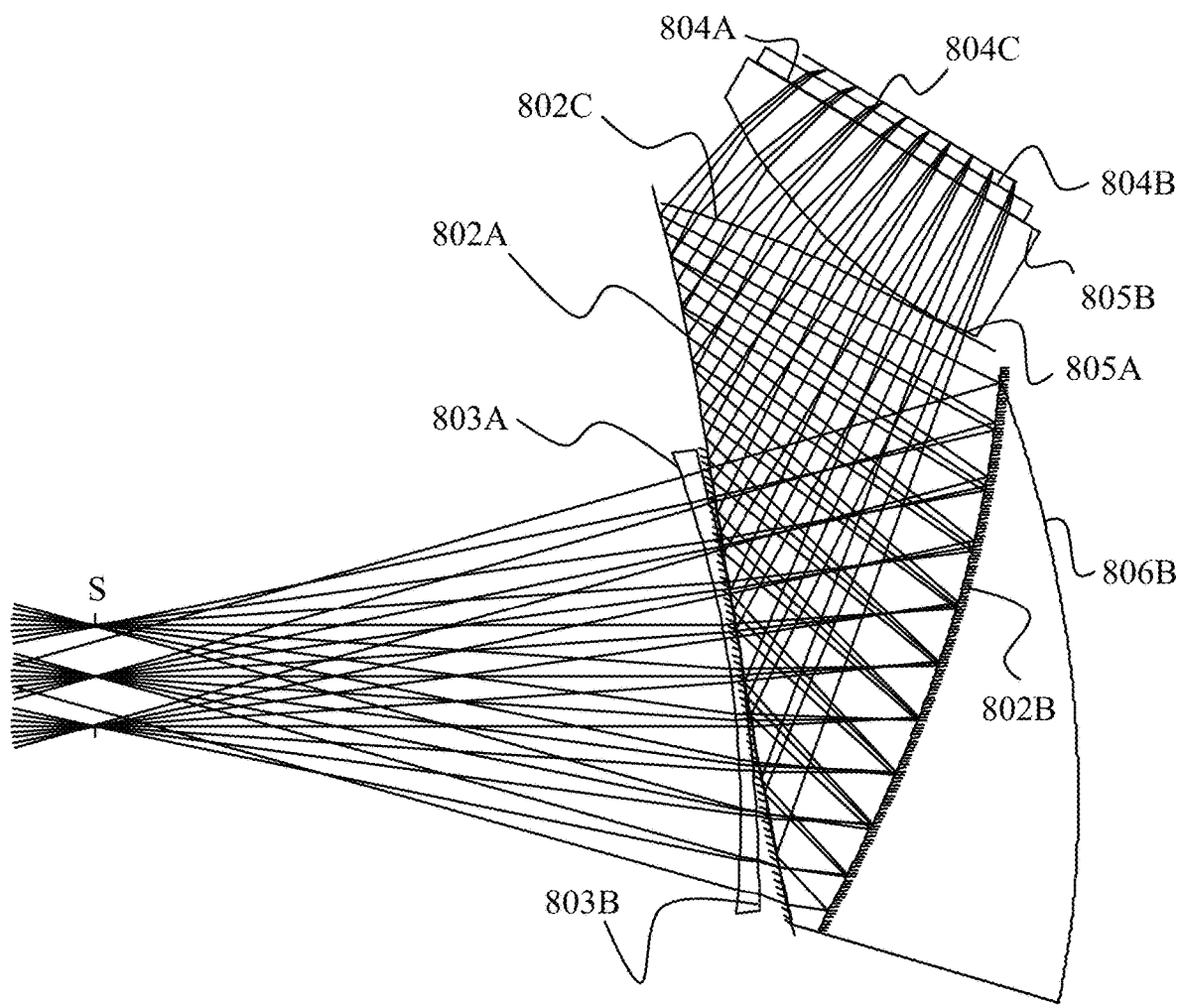
FIG. 18 is an explanatory diagram of a Numerical Example 4.

Next, a description will be given of an eyepiece optical system and a display apparatus according to a fourth embodiment of the present disclosure with reference to FIGS. 8 and 18. FIG. 8 is a configuration diagram illustrating the display apparatus having an eyepiece optical system in this embodiment. FIG. 18 is an explanatory diagram of a Numerical Example 4 corresponding to this embodiment. The image display apparatus 801 as a display apparatus includes the eyepiece optical system as an optical system and an image display element 804 as a display element. The eyepiece optical system is configured to guide a light beam from the image display element 804 to an exit pupil S. In this embodiment, the image display element is configured so that the image display element of the third embodiment is made smaller and that an observer can superimpose a transmission image and a display image for observation.

A light beam emitted from the image display element 804 passes through a convex lens 805 of a positive lens, a first optical element 802, and a concave lens 803 and forms the exit pupil S. In this embodiment, as in the second embodiment, a third optical element 806 is disposed on a side of the first optical element 802, the side being opposite to the exit pupil S. Here, when a reflectance of a reflection surface 802B of the first optical element is set lower than 100%, the observer who places a pupil near the exit pupil S can also observe an outside image via the concave lens 803, the first optical element 802, and the third optical element 806. That is, the observer can simultaneously observe the outside image and the image displayed on the image display element 804.

Figure 9:
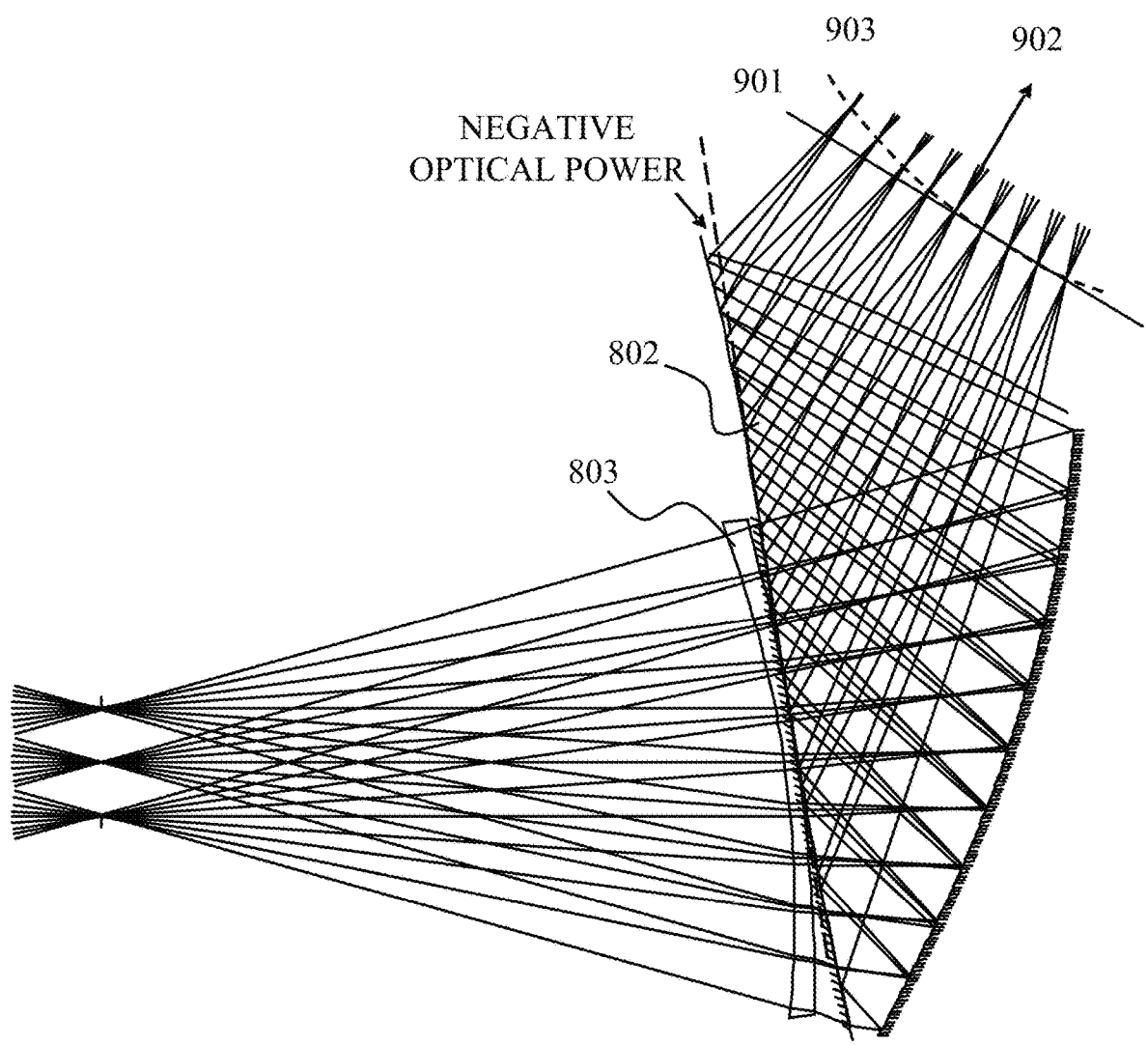
FIG. 9 is an explanatory diagram of field curvature according to the fourth embodiment.

In the optical system of this embodiment, the image display element 804 is configured so that a size is 0.5 inch and an angle of view is 50°. A focal length of the eyepiece optical system is about 13.5 mm. An eye point is as large as 25 mm, and thus field curvature occurring in the concave lens 803 and the first optical element 802 is very large as illustrated in FIG. 9. Therefore, as in the second embodiment, the convex lens 805 is disposed between the first optical element 802 and the image display element 804.

Here, a description will be given of field curvature occurring in the concave lens 803 and the first optical element 802 with reference to FIG. 9. FIG. 9 is an explanatory diagram of field curvature in this embodiment. A reference numeral 901 denotes an imaging plane near a position where a light beam passing through the exit pupil S is imaged by the concave lens 803 and the first optical element 802. A reference numeral 902 is an axis of a normal direction of the imaging plane 901. A reference numeral 903 denotes an image plane of the first optical element 802 and the concave lens 803. As described in the second embodiment, a main factor of field curvature is a sag of the reflection surface 802B. However, in reality, two factors (factors 1 and 2) are also involved in forming the image plane.

Factor 1

The reflection-transmission surface 802A totally reflects the light beam entering the entrance surface 802C. The light beam enters the reflection-transmission surface 802A in a section, i.e., a YZ section, of FIG. 9 at a very large angle, which is equal to or greater than a total reflection angle, and thus when aberration correction is taken into consideration, the reflection-transmission surface 802A may not have a strong optical power, and the YZ section may not have a strong optical power. However, in order to have the total reflection angle, an upper part of the reflection-transmission surface 802A deviates from a straight line and the reflection-transmission surface 802A has a negative power, that is, has a shape curved backwards. Therefore, as illustrated in FIG. 9, the light beam passing through the upper part of the reflection-transmission surface 802A is affected by the negative optical power and is imaged at a position farther than a position where a light beam passing through a lower part of the reflection-transmission surface 802A is imaged.

Factor 2

The reflection-transmission surface 802A has a configuration close to concentric configuration as described in the third embodiment, and has a curvature in a section in the X-axis direction. Therefore, the reflection-transmission surface 802A has a negative power at a time of total reflection, and as a result, a stronger negative field curvature occurs in the section of the X-axis direction than in a section of the Y direction.

The above two factors cause the concave lens 803 and the first optical element 802 to generate asymmetric field curvature in a YZ section and a strong negative field curvature in the X-axis direction. In order to correct these aberrations, the convex lens 805 has the following features.

Feature 1

The convex lens 805 is shifted and disposed so that the light beam passing through the reflection surface 802B side of the first optical element passes through part of the convex lens 805 as the positive lens thicker than part through which the light beam on the reflection-transmission surface 802A side passes.

Feature 2

In the convex lens 805, a convex surface 805A as an exit surface on the first optical element 802 side is an anamorphic surface and satisfies the following inequality (22).

$$R_{PX} < R_{PY} \quad (22)$$

Here, $R_{PX}$ represents a curvature radius of the convex surface 805A of the convex lens 805 in the X-axis direction, and $R_{PY}$ represents a curvature radius of the convex surface 805A of the convex lens 805 in the Y-axis direction. In other words, the convex surface 805A of the convex lens 805 faces the first optical element 802, $R_{PY}$ is the curvature radius of the convex surface 805A of the convex lens 805 in a section including the principal ray of the central angle-of-view light beam passing through the image display element 804 to the exit pupil S, and $R_{PX}$ is the curvature radius of the convex surface 805A of the convex lens 805 in a section orthogonal to the section including the principal ray of the central angle-of-view light beam.

With respect to field curvature that asymmetrically occurs, the convex lens 805 is shifted in the YZ section and disposed so that a sag amount is made asymmetric, and thereby the field curvature is efficiently corrected. With respect to field curvature that strongly occurs in the X-axis direction, the convex lens 805 is configured so that the curvature radius in the X-axis direction is reduced, and thereby the field curvature can be effectively corrected in all section directions.

In this embodiment, in the section of FIG. 8, a thickness of the convex lens 805 near a light beam, which passes through a position closest to the reflection-transmission surface 802A, is about 2.7 mm, and a thickness of the convex lens 805 near a light beam, which passes through a position closest to the reflection surface 802B, is about 5 mm. The curvature radii of the convex surface 805A as the exit surface of the convex lens 805 are set to $R_{PX}$=15.51 mm and $R_{PY}$=22.51 mm.

Fifth Embodiment

Figure 10:
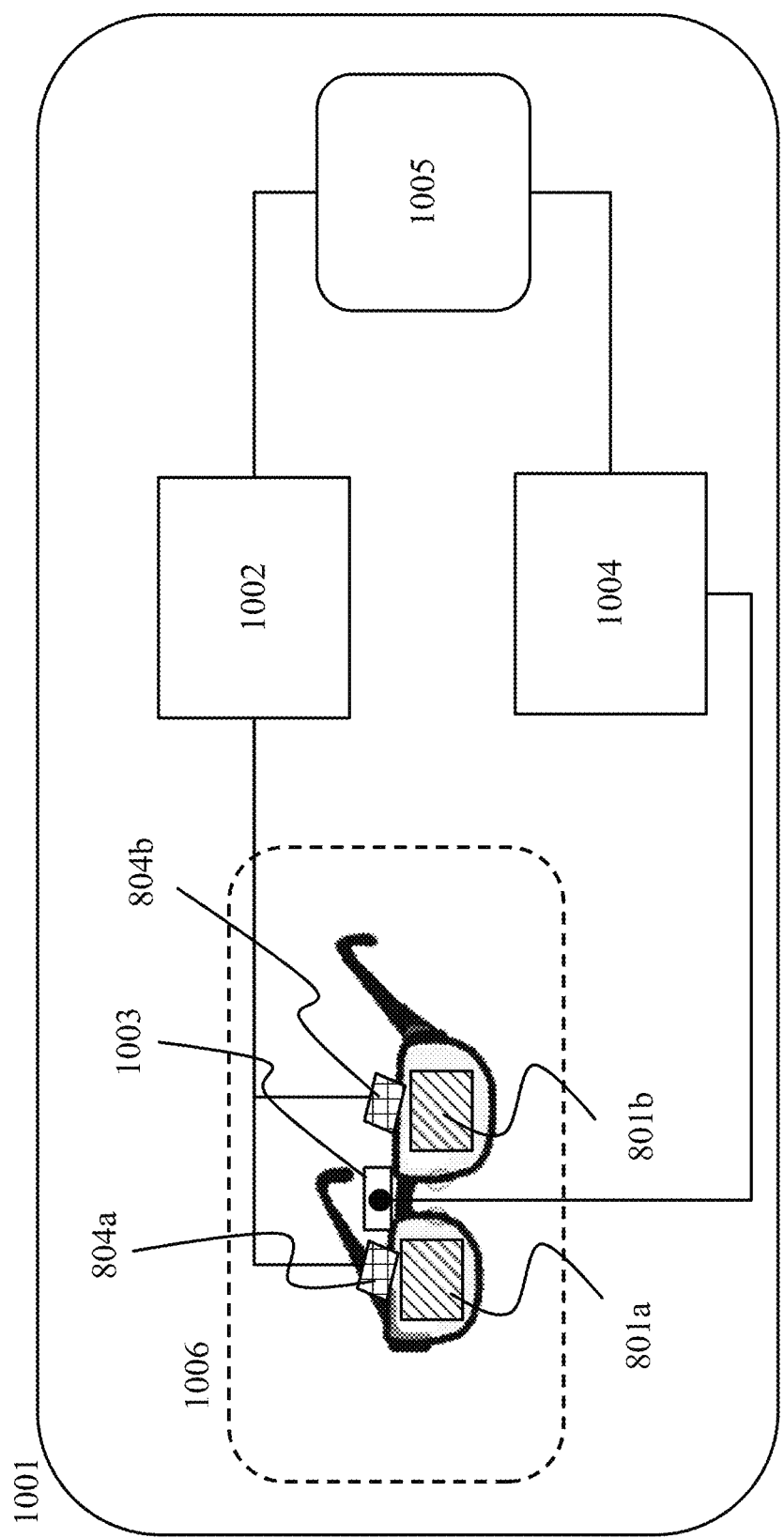
FIG. 10 is a configuration diagram illustrating a display apparatus according to a fifth embodiment.

Next, a description will be given of an observation apparatus 1001 as a display apparatus according to a fifth embodiment of the present disclosure with reference to FIG. 10. FIG. 10 is a configuration diagram illustrating the observation apparatus 1001 including an eyepiece optical system of the fourth embodiment. The observation apparatus 1001 is configured as smart glasses including an optical see-through display.

The observation apparatus 1001 includes eyepiece optical systems 801a and 801b, and image display elements 804a and 804b according to the fourth embodiment, and an image display circuit 1002 connected to them. The observation apparatus 1001 further includes a camera 1003, an image pickup circuit 1004 configured to process an image acquired by the camera 1003, and an image recognition unit 1005 configured to recognize an object being captured from the image processed by the image pickup circuit 1004. The eyepiece optical systems 801a and 801b and the camera 1003 are disposed inside a headset unit 1006.

An observer wears the headset unit 1006 of the observation apparatus 1001 in a same manner as glasses. When the headset unit 1006 is worn, pupils of the observer's eyes (both eyes) are respectively located near an exit pupil S and an exit pupil S' (not illustrated) of the eyepiece optical systems 801a and 801b which are mounted on the headset unit 1006. As a result, images displayed on the image display elements 804a and 804b are viewed as an enlarged virtual image by the observer.

Figure 11:
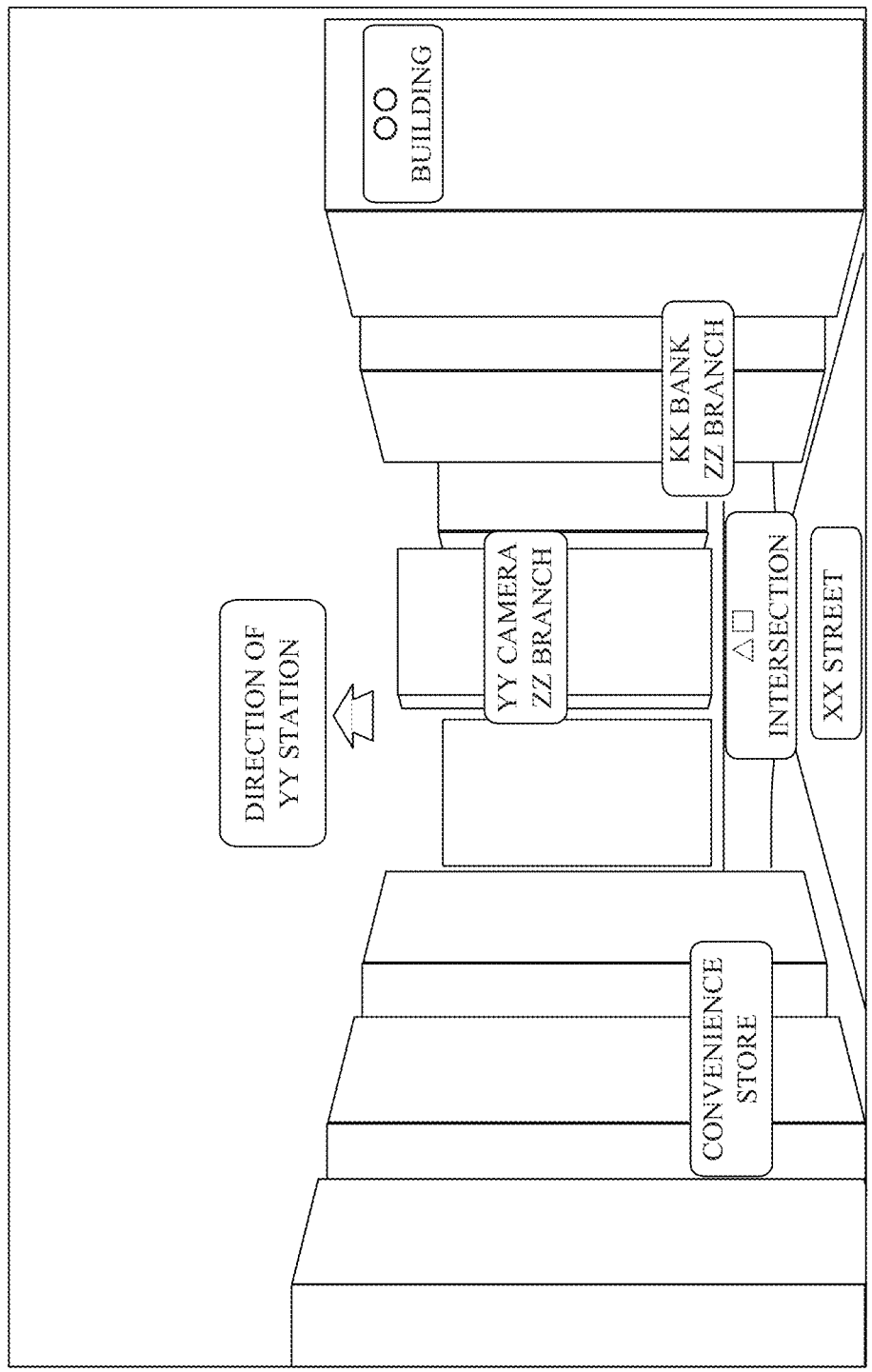
FIG. 11 is a diagram illustrating an overlap display of information according to the fifth embodiment.

The camera 1003 attached to the headset unit 1006 acquires an image in a direction of observation by the observer. The image imaged by the camera 1003 is transmitted to the image recognition unit 1005 via the image pickup circuit 1004. The image recognition unit 1005 recognizes what is captured in the captured image, and transmits text information or the like, which describes the imaged object, to the image display circuit 1002. The image display circuit 1002 displays useful character information for a portion near or overlapping the object on the image display elements 804a and 804b based on the information received from the image recognition unit 1005. For example, information is a restaurant name captured in a field of view and menu information, detailed information on an exhibit of a museum or the like, information on a price and a production area of a product in a store, map information, navigation information, or the like. By superimposing such information on an outside image that can be seen through the eyepiece optical systems 801a and 801b, as illustrated in FIG. 11, the observer can observe a surrounding real space with the information added. FIG. 11 is a diagram illustrating an overlap display of information. The information is not limited to text information, but may be image information of a moving image or a still image. In addition to simply giving information, it is also possible that the observer views an augmented reality space in which another image such as a game image, a fictional building image, or the like is superimposed on a real space.

When a performance of the image recognition unit 1005 and the camera 1003 to detect information on the outside (outside information) is insufficient, information to be used may be acquired by another method such as a method of acquiring information in a three-dimensional direction using an acceleration sensor and a method of adding information on a position of the observer and the direction of observation using GPS and map information. By acquiring the outside information by a plurality of methods, accuracy in a position of superimposed information can be improved, and the information can be superimposed on the real space without deviation. As a result, for example, while driving a bicycle or the like, the observer can make navigation information displayed in front of the eyes, can acquire direction instruction information based on an accurate position by GPS without greatly moving a visual line, and can realize safe driving.

If a displayed angle of view is narrow, the displayed information is concentrated near the center of the field of view, and the display may annoy the observer. When the eyepiece optical systems 801a and 801b of this embodiment are used, since the display angle of view is wide, it is possible to display information within a range that does not annoy the observer.

By configuring an optical see-through display having wide angle of view eyepiece optical systems as described above, smart glasses can be acquired that can superimpose new information image on a real space of a relatively wide field of view within a range that does not annoy the observer. Such smart glasses make it possible to display information while hindering the display in the field of view from annoying the observer and the visual line from greatly moving during, for example, driving, sports, or work using both hands. This embodiment has described the observation apparatus that displays information to both eyes of the observer, but the observation apparatus may display information to one eye of the observer. In that case, it is sufficient to have an eyepiece optical system for one eye.

Hereinafter, a description will be given of the Numerical Examples 1 to 4 corresponding to the first to fourth embodiments, respectively. In the description of each embodiment, the description was given of the optical path in order from the light source, but in each numerical example, a ray is traced from a pupil position of a projection optical system.

Tables 1 to 12 describe the respective numerical examples. In the description, a reference of an absolute coordinate system is described as a Global origin. Tables 1 to 3 correspond to the first embodiment, Tables 4A to 6 correspond to the second embodiment, Tables 7 to 9 correspond to the third embodiment, and Tables 10A to 12 correspond to the fourth embodiment.

Three-dimensional coordinate axes in the absolute coordinate system are defined as a Z-axis, a Y-axis, and an X-axis as follows.

The Z-axis is a straight line that passes through a center of a 0-th surface to a center of a first surface, i.e., an origin of absolute coordinates, and this direction is a positive direction.

The Y-axis is a straight line that passes through the center of the first surface, i.e., the origin of the absolute coordinates, and forms 90 degrees counterclockwise with the Z-axis.

The X-axis is a straight line that passes through the origin and is orthogonal to the Z-axis and the Y-axis.

A local coordinate system is set, and a surface shape of an i-th surface included in the optical system is expressed by a function based on the local coordinate system. A tilt angle of the i-th surface in the YZ plane is represented by an angle $\theta g_i$ (unit: degree) formed with the Z axis of the absolute coordinate system where the counterclockwise direction is a positive direction. In each numerical example, the tilt angle is set only in the YZ plane. y and z axes of the local coordinate system (x, y, z) of the i-th surface are in the YZ plane of the absolute coordinate system, and are tilted by the angle $\theta g_i$ in the YZ plane.

The z-axis is a straight line that passes through an origin of the local coordinates and forms an angle $\theta_i$ with the Z-axis of the absolute coordinate system counterclockwise in the YZ plane.

The y-axis is a straight line that passes through the origin of local coordinates and forms 90 degrees with the z direction counterclockwise in the YZ plane.

The x-axis is a straight line that passes through the origin of local coordinates and is orthogonal to the YZ plane.

Ndi and vdi represent a refractive index and an Abbe number at the d-line between the i-th surface and an (i+1)-th surface.

A surface shape that does not have a rotational symmetry axis used in each numerical example is expressed by the following function. In each table, a non-rotational symmetry plane is described as XYP.

$$z = \frac{cr^2}{1+\sqrt{1-(1+k)c^2r^2}} + c2x + c3y + c4x^2 + c5xy + c6y^2 + c7x^3 +$$
$$c8x^2y + c9xy^2 + c10y^3 + c11x^4 + c12x^3y + c13x^2y^2 + c14xy^3 +$$
$$c15y^4 + c16x^5 + c17x^4y + c18x^3y^2 + c19x^2y^3 + c20xy^4 + c21y^5 +$$
$$c22x^6 + c23x^5y + c24x^4y^2 + c25x^3y^3 + c26x^2y^4 + c27xy^5 +$$
$$c28y^6 + c29x^7 + c30x^6y + c31x^5y^2 + c32x^4y^3 + c33x^3y^4 +$$
$$c34x^2y^5 + c35xy^6 + c36y^7 + c37x^8 + c38x^7y + c39x^6y^2 +$$
$$c40x^5y^3 + c41x^4y^4 + c42x^3y^5 + c43x^2y^6 + c44xy^7 + c45y^8$$

This function defines the surface shape by the local coordinates (x, y, z) of the i-th surface. In this same function, when a term with x of an odd-order is 0, a plane symmetric with respect to the yz plane can be obtained in the local coordinate system. A function of a toroidal surface used in each numerical example is given below. In each numerical example, the toroidal surface is described as XTO.

$$Z = \frac{(CUX)x^2}{1+\sqrt{1-(1+k)(CUX)^2x^2}} + Ax^4 + Bx^6 + Cx^8 + Dx^{10}$$

In each numerical example, eccentricities of a surface vertex of each surface are only shift eccentricities in the y- and z-axes directions and a tilt eccentricity around the x-axis, and thus in each surface, a section in a standard generatrix and a section in a local generatrix are the same section, but a section in a standard sagittal line and a section in a local sagittal line are different.

In each numerical example, if a numerical value is written in a column Yg, Zg, or $\theta g$ in a table indicating the position of the local origin, an origin of the surface is at a position rotated around the Y-axis, Z-axis, or X-axis from a surface described as the Global origin. If those columns are empty, the surface is located at a position shifted in the Z-axis direction by a distance of D from a surface in front of that surface. The coordinate system of each numerical example is based on a position of the Global origin.

XYP indicates that the surface is a free-form surface, SPH indicates that the surface has a spherical shape, and XTO indicates that the surface is a toroidal surface, and respective coefficients are described in the attached tables. M indicates that the surface is a reflection surface.

Numerical Example 1

Figure 13:
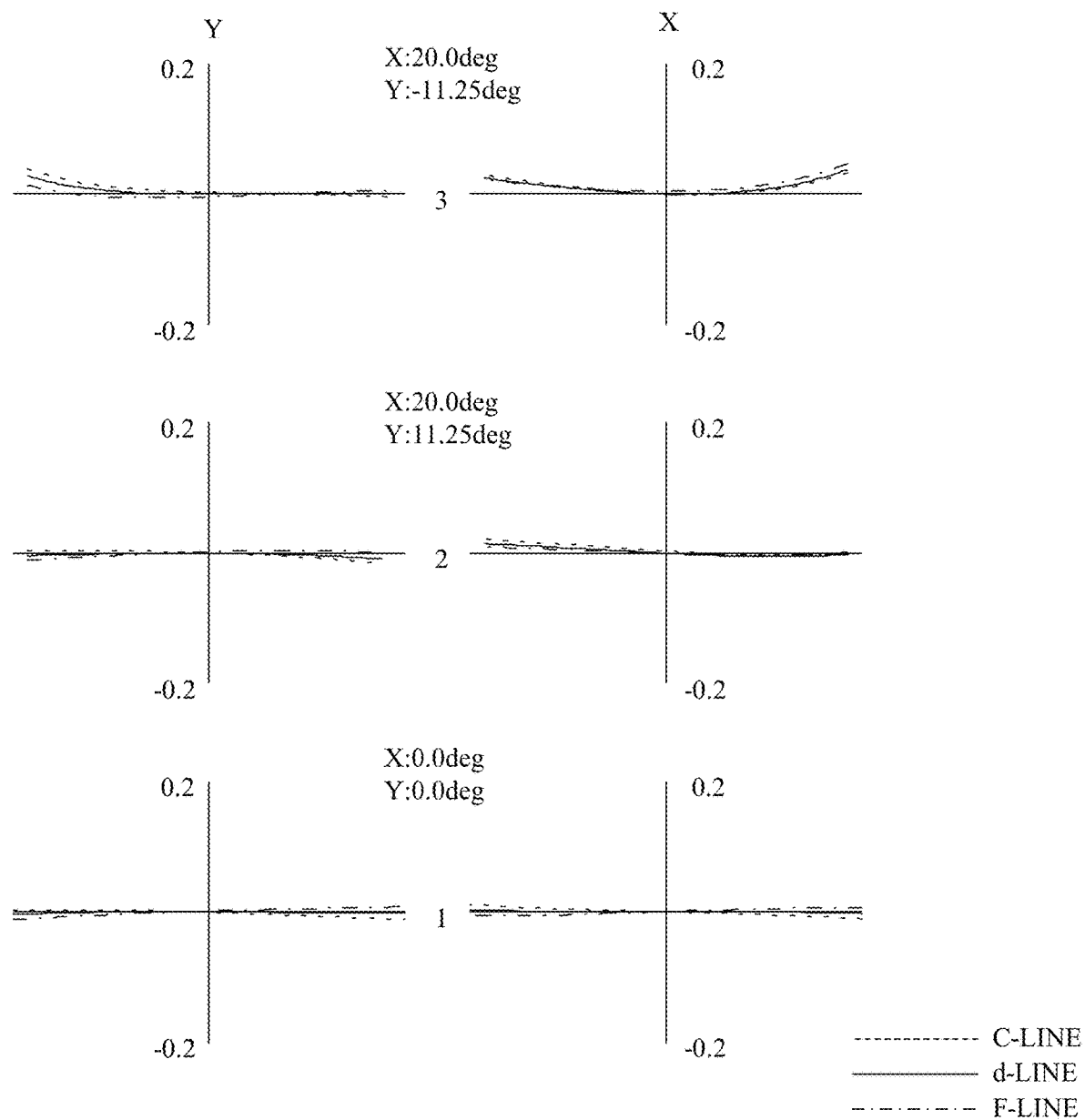
FIG. 13 is a lateral aberration diagram of an eyepiece optical system according to the Numerical Example 1.

A horizontal angle of view in a direction perpendicular to a plane of a figure is +20.5 degrees, a vertical angle of view in a direction parallel to the plane of the figure is +11.25 degrees, and a pupil diameter is 4 mm. Each surface number corresponds to that illustrated in FIG. 12. FIG. 12 illustrates the same optical system as in FIG. 1. Table 1 indicates a position of a local origin on each surface. Table 2 indicates coefficients of non-rotational symmetry surfaces. Table 3 indicates values of various conditions. FIG. 13 is a lateral aberration diagram of an eyepiece optical system according to this numerical example.

TABLE 1

| Type | Sur. No. | Yg | Zg | θ g | Rx | Ry | D | Nd | Vd |
|---|---|---|---|---|---|---|---|---|---|
| SPH |  | 0.000 | 0.000 | 0.000 | −1400.000 | −1400.000 | −1400.000 |  |  |
| SPH | S |  |  |  | 0.000 | 0.000 | 0.000 |  |  |
| SPH | 104A |  | 21.100 |  | −69.858 | −69.858 | 0.500 | 1.8467 | 23.78 |
| SPH | 103A |  | 21.600 |  | 0.000 | 0.000 | 0.000 | 1.5311 | 55.75 |
| XYP | 103B | 0.807 | 24.006 | −8.061 | 0.000 | 0.000 | 0.000 |  |  |
| XYP | 102A | 0.807 | 24.106 | −8.061 | 0.000 | 0.000 | 0.000 | 1.5311 | 55.75 |
| XYP-M | 102B | −0.429 | 33.486 | −10.888 | −296.952 | −296.952 | 0.000 | 1.5311 | 55.75 |
| XYP-M | 102A | 0.807 | 24.106 | −8.061 | 0.000 | 0.000 | 0.000 | 1.5311 | 55.75 |
| XYP | 102C | 17.364 | 30.688 | 40.083 | 0.000 | 0.000 | 0.000 |  |  |
| SPH | 105A | 21.895 | 31.876 | 56.264 | 0.000 | 0.000 | 0.700 | 1.5163 | 64.14 |
| SPH | 105B |  |  |  | 0.000 | 0.000 | 0.500 |  |  |
| SPH | 105C |  |  |  | 0.000 | 0.000 | 0.000 |  |  |

TABLE 2

| | 103B | | 102A | | 102B | | 102C |
|---|---|---|---|---|---|---|---|
| K | 0.0000E+00 | K | 0.0000E+00 | K | −3.6529E+02 | K | 0.0000E+00 |
| C2 | 0.0000E+00 | C2 | 0.0000E+00 | C2 | 0.0000E+00 | C2 | 0.0000E+00 |
| C3 | −3.2696E−01 | C3 | −3.2696E−01 | C3 | 1.2299E−01 | C3 | −2.0209E−01 |
| C4 | −7.7526E−03 | C4 | −7.7526E−03 | C4 | −9.5121E−03 | C4 | −3.0231E−02 |
| C5 | 0.0000E+00 | C5 | 0.0000E+00 | C5 | 0.0000E+00 | C5 | 0.0000E+00 |
| C6 | 3.3061E−04 | C6 | 3.3061E−04 | C6 | −8.8607E−03 | C6 | −1.9984E−02 |
| C7 | 0.0000E+00 | C7 | 0.0000E+00 | C7 | 0.0000E+00 | C7 | 0.0000E+00 |
| C8 | −1.0402E−04 | C8 | −1.0402E−04 | C8 | 5.6648E−05 | C8 | −2.2046E−03 |
| C9 | 0.0000E+00 | C9 | 0.0000E+00 | C9 | 0.0000E+00 | C9 | 0.0000E+00 |
| C10 | −1.7722E−04 | C10 | −1.7722E−04 | C10 | −7.4076E−05 | C10 | −4.8673E−03 |
| C11 | 3.3088E−06 | C11 | 3.3088E−06 | C11 | −3.0488E−06 | C11 | 2.3923E−04 |
| C12 | 0.0000E+00 | C12 | 0.0000E+00 | C12 | 0.0000E+00 | C12 | 0.0000E+00 |
| C13 | −7.6634E−06 | C13 | −7.6634E−06 | C13 | −2.6183E−06 | C13 | 3.3753E−04 |
| C14 | 0.0000E+00 | C14 | 0.0000E+00 | C14 | 0.0000E+00 | C14 | 0.0000E+00 |
| C15 | −7.4127E−06 | C15 | −7.4127E−06 | C15 | 1.6202E−06 | C15 | −2.5241E−04 |
| C16 | 0.0000E+00 | C16 | 0.0000E+00 | C16 | 0.0000E+00 | C16 | 0.0000E+00 |
| C17 | 5.0128E−07 | C17 | 5.0128E−07 | C17 | −4.1324E−08 | C17 | 9.6026E−06 |
| C18 | 0.0000E+00 | C18 | 0.0000E+00 | C18 | 0.0000E+00 | C18 | 0.0000E+00 |
| C19 | 7.7983E−07 | C19 | 7.7983E−07 | C19 | 1.1586E−07 | C19 | 7.3406E−05 |
| C20 | 0.0000E+00 | C20 | 0.0000E+00 | C20 | 0.0000E+00 | C20 | 0.0000E+00 |
| C21 | −2.9728E−07 | C21 | −2.9728E−07 | C21 | −5.6173E−08 | C21 | 4.4516E−05 |
| C22 | −1.1107E−08 | C22 | −1.1107E−08 | C22 | 5.1841E−09 | C22 | −2.1856E−06 |
| C23 | 0.0000E+00 | C23 | 0.0000E+00 | C23 | 0.0000E+00 | C23 | 0.0000E+00 |
| C24 | −1.3301E−08 | C24 | −1.3301E−08 | C24 | −2.4133E−09 | C24 | −4.5794E−06 |
| C25 | 0.0000E+00 | C25 | 0.0000E+00 | C25 | 0.0000E+00 | C25 | 0.0000E+00 |
| C26 | 8.9318E−08 | C26 | 8.9318E−08 | C26 | −5.2600E−09 | C26 | −1.1833E−06 |
| C27 | 0.0000E+00 | C27 | 0.0000E+00 | C27 | 0.0000E+00 | C27 | 0.0000E+00 |
| C28 | −1.4104E−09 | C28 | −1.4104E−09 | C28 | 2.7383E−10 | C28 | 1.5768E−06 |
| C29 | 0.0000E+00 | C29 | 0.0000E+00 | C29 | 0.0000E+00 | C29 | 0.0000E+00 |
| C30 | 4.6262E−10 | C30 | 4.6262E−10 | C30 | 0.0000E+00 | C30 | −1.7688E−08 |
| C31 | 0.0000E+00 | C31 | 0.0000E+00 | C31 | 0.0000E+00 | C31 | 0.0000E+00 |
| C32 | −8.8741E−09 | C32 | −8.8741E−09 | C32 | 0.0000E+00 | C32 | −2.5374E−07 |
| C33 | 0.0000E+00 | C33 | 0.0000E+00 | C33 | 0.0000E+00 | C33 | 0.0000E+00 |
| C34 | −1.2440E−09 | C34 | −1.2440E−09 | C34 | 0.0000E+00 | C34 | −5.8604E−07 |
| C35 | 0.0000E+00 | C35 | 0.0000E+00 | C35 | 0.0000E+00 | C35 | 0.0000E+00 |
| C36 | 1.6672E−10 | C36 | 1.6672E−10 | C36 | 0.0000E+00 | C36 | −4.4831E−07 |
| C37 | 0.0000E+00 | C37 | 0.0000E+00 | C37 | 0.0000E+00 | C37 | 6.9768E−09 |
| C38 | 0.0000E+00 | C38 | 0.0000E+00 | C38 | 0.0000E+00 | C38 | 0.0000E+00 |
| C39 | 0.0000E+00 | C39 | 0.0000E+00 | C39 | 0.0000E+00 | C39 | 1.2757E−08 |
| C40 | 0.0000E+00 | C40 | 0.0000E+00 | C40 | 0.0000E+00 | C40 | 0.0000E+00 |
| C41 | 0.0000E+00 | C41 | 0.0000E+00 | C41 | 0.0000E+00 | C41 | 2.6502E−08 |
| C42 | 0.0000E+00 | C42 | 0.0000E+00 | C42 | 0.0000E+00 | C42 | 0.0000E+00 |
| C43 | 0.0000E+00 | C43 | 0.0000E+00 | C43 | 0.0000E+00 | C43 | 2.4262E−08 |
| C44 | 0.0000E+00 | C44 | 0.0000E+00 | C44 | 0.0000E+00 | C44 | 0.0000E+00 |
| C45 | 0.0000E+00 | C45 | 0.0000E+00 | C45 | 0.0000E+00 | C45 | 2.2985E−08 |

TABLE 3

| | | | |
|---|---|---|---|
| $n_n$ | | 1.8467 | |
| $n_m$ | | 1.5311 | |
| $\alpha_1-\alpha_2$ | | 0.0 | |
| $(n_n-1)/(n_o-1)$ | 1.59 | $n_o = 1.5311$ | |
| $\varphi_n/\varphi_A$ | −0.21 | $\varphi_n = -0.0123, \varphi_A = 0.0585$ | |

Numerical Example 2

Figure 15:
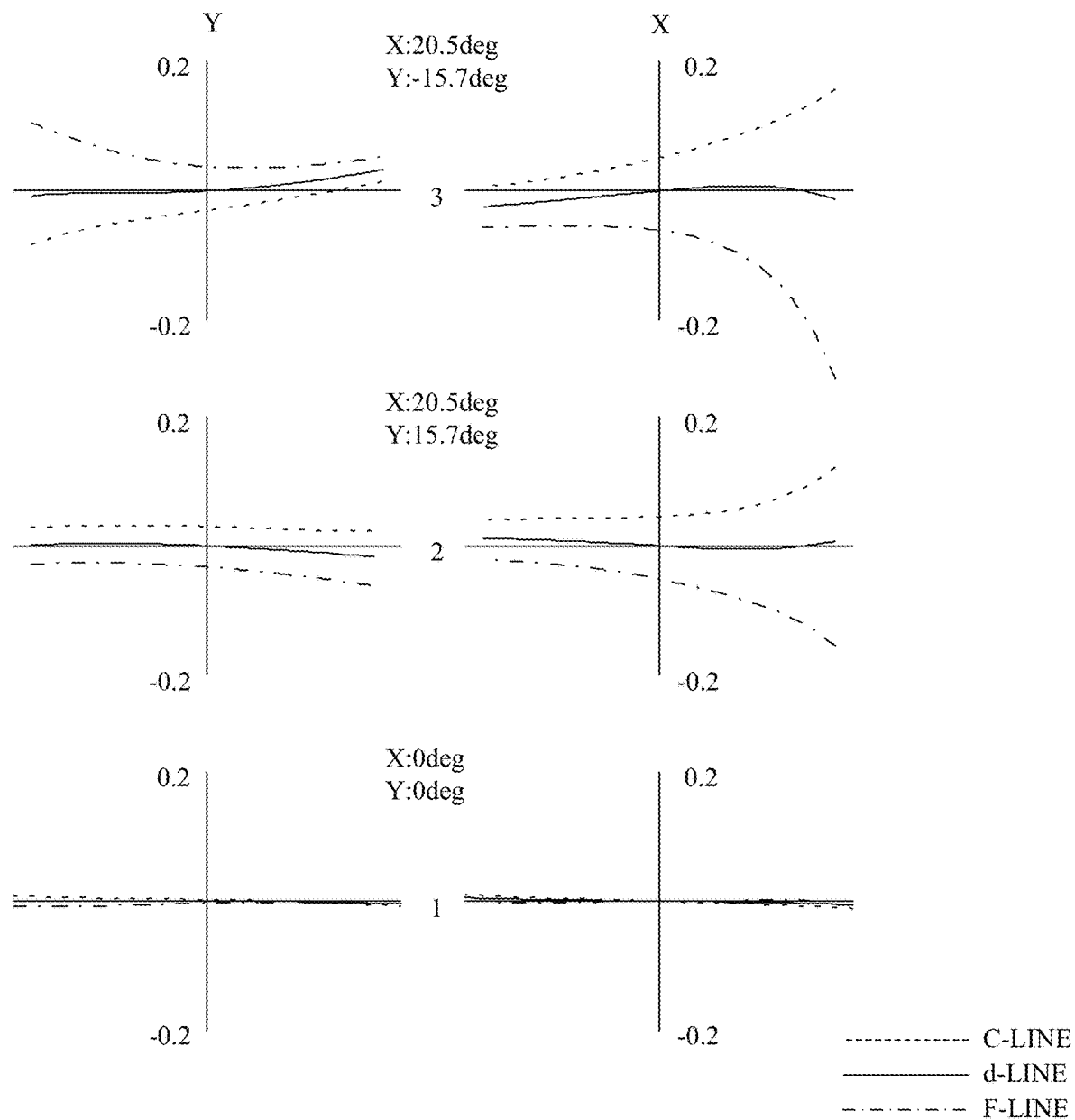
FIG. 15 is a lateral aberration diagram of an eyepiece optical system according to the Numerical Example 2.

A horizontal angle of view in a direction perpendicular to a plane of a figure is ±20.5 degrees, a vertical angle of view in a direction parallel to the plane of the figure is ±15.56 degrees, and a pupil diameter is 4 mm. Each surface number corresponds to that illustrated in FIG. 14. FIG. 14 illustrates the same optical system as in FIG. 4. Table 4A indicates a position of a local origin on each surface in an optical path via which an image from a display element is observed. Table 4B indicates a position of a local origin on each surface in an optical path via which outside is observed. Table 5 indicates coefficients of non-rotational symmetry surfaces. Table 6 indicates values of various conditions. FIG. 15 is a lateral aberration diagram of an eyepiece optical system according to this numerical example.

TABLE 4A

| Type | Sur. No. | Yg | Zg | θ g | Rx | Ry | D | Nd | Vd |
|---|---|---|---|---|---|---|---|---|---|
| SPH | | 0.000 | 0.000 | 0.000 | −1400.000 | −1400.000 | −1400.000 | | |
| SPH | S | | | | 0.000 | 0.000 | 0.000 | | |
| SPH | 404A | | 21.100 | | −69.858 | −69.858 | 0.500 | 1.8467 | 23.78 |
| SPH | 403A | | 21.600 | | 0.000 | 0.000 | 0.000 | 1.5311 | 55.75 |
| XYP | 403B | 2.509 | 23.932 | −6.163 | 0.000 | 0.000 | 0.000 | | |
| XYP | 402A | 2.509 | 24.032 | −6.163 | 0.000 | 0.000 | 0.000 | 1.5311 | 55.75 |
| XYP-M | 402B | 0.616 | 32.481 | −10.313 | 0.000 | 0.000 | 0.000 | 1.5311 | 55.75 |
| XYP-M | 402A | 2.509 | 24.032 | −6.163 | −241.024 | −241.024 | 0.000 | 1.5311 | 55.75 |
| XYP | 402C | 14.522 | 28.264 | 51.106 | 0.000 | 0.000 | 0.000 | | |
| SPH | 406A | 14.647 | 28.270 | 53.021 | 12.937 | 12.937 | 4.540 | 1.9108 | 35.25 |
| SPH | 406B | | | | 294.649 | 294.649 | 0.000 | | |
| SPH | 405A | 19.112 | 30.358 | 56.599 | 0.000 | 0.000 | 0.700 | 1.5163 | 64.14 |
| SPH | 405B | | | | 0.000 | 0.000 | 0.500 | | |
| SPH | 405C | | | | 0.000 | 0.000 | 0.000 | | |

TABLE 4B

| Type | Sur. No. | Yg | Zg | θ g | Rx | Ry | D | Nd | Vd |
|---|---|---|---|---|---|---|---|---|---|
| SPH | | 0.000 | 0.000 | 0.000 | −1400.000 | −1400.000 | −1400.000 | | |
| SPH | S | | | | 0.000 | 0.000 | 0.000 | | |
| SPH | 404A | | 21.100 | | −69.858 | −69.858 | 0.500 | 1.8467 | 23.78 |
| SPH | 403A | | 21.600 | | 0.000 | 0.000 | 0.000 | 1.5311 | 55.75 |
| XYP | 403B | 2.509 | 23.932 | −6.163 | 0.000 | 0.000 | 0.000 | | |
| XYP | 402B | 2.509 | 24.032 | −6.163 | 0.000 | 0.000 | 0.000 | 1.5311 | 55.75 |
| ASP | 407B | 0.000 | 16.000 | 0.000 | −49.077 | −49.077 | 0.000 | | |

TABLE 5

| | 403B | | 402A | | 402B | | 402C | | 407B |
|---|---|---|---|---|---|---|---|---|---|
| K | 0.0000E+00 | K | 0.0000E+00 | K | −4.3594E+02 | K | 0.0000E+00 | K | 6.1267E−01 |
| C2 | 0.0000E+00 | C2 | 0.0000E+00 | C2 | 0.0000E+00 | C2 | 0.0000E+00 | C2 | 0.0000E+00 |
| C3 | −3.1071E−01 | C3 | −3.1071E−01 | C3 | 1.4460E−01 | C3 | −6.3477E−02 | C3 | 0.0000E+00 |
| C4 | −4.7562E−03 | C4 | −4.7562E−03 | C4 | −1.0392E−02 | C4 | −3.0518E−02 | C4 | 0.0000E+00 |
| C5 | 0.0000E+00 | C5 | 0.0000E+00 | C5 | 0.0000E+00 | C5 | 0.0000E+00 | C5 | 0.0000E+00 |
| C6 | 3.5029E−03 | C6 | 3.5029E−03 | C6 | −8.6102E−03 | C6 | 9.6398E−03 | C6 | 0.0000E+00 |
| C7 | 0.0000E+00 | C7 | 0.0000E+00 | C7 | 0.0000E+00 | C7 | 0.0000E+00 | C7 | 0.0000E+00 |
| C8 | −3.6860E−04 | C8 | −3.6860E−04 | C8 | −1.4165E−05 | C8 | −3.1614E−03 | C8 | 0.0000E+00 |
| C9 | 0.0000E+00 | C9 | 0.0000E+00 | C9 | 0.0000E+00 | C9 | 0.0000E+00 | C9 | 0.0000E+00 |
| C10 | −1.2020E−04 | C10 | −1.2020E−04 | C10 | −1.4267E−04 | C10 | −6.8351E−03 | C10 | 0.0000E+00 |
| C11 | −1.1301E−06 | C11 | −1.1301E−06 | C11 | −4.9770E−06 | C11 | 3.3601E−04 | C11 | 0.0000E+00 |
| C12 | 0.0000E+00 | C12 | 0.0000E+00 | C12 | 0.0000E+00 | C12 | 0.0000E+00 | C12 | 0.0000E+00 |
| C13 | −1.5163E−05 | C13 | −1.5163E−05 | C13 | 6.3544E−07 | C13 | 3.6393E−04 | C13 | 0.0000E+00 |
| C14 | 0.0000E+00 | C14 | 0.0000E+00 | C14 | 0.0000E+00 | C14 | 0.0000E+00 | C14 | 0.0000E+00 |
| C15 | −9.2784E−06 | C15 | −9.2784E−06 | C15 | 1.6519E−06 | C15 | −2.7614E−04 | C15 | 0.0000E+00 |
| C16 | 0.0000E+00 | C16 | 0.0000E+00 | C16 | 0.0000E+00 | C16 | 0.0000E+00 | C16 | 0.0000E+00 |
| C17 | 1.9869E−07 | C17 | 1.9869E−07 | C17 | −4.1345E−08 | C17 | 1.9155E−05 | C17 | 0.0000E+00 |
| C18 | 0.0000E+00 | C18 | 0.0000E+00 | C18 | 0.0000E+00 | C18 | 0.0000E+00 | C18 | 0.0000E+00 |
| C19 | 7.9400E−07 | C19 | 7.9400E−07 | C19 | 7.5607E−08 | C19 | 1.0145E−04 | C19 | 0.0000E+00 |
| C20 | 0.0000E+00 | C20 | 0.0000E+00 | C20 | 0.0000E+00 | C20 | 0.0000E+00 | C20 | 0.0000E+00 |
| C21 | −4.3159E−07 | C21 | −4.3159E−07 | C21 | 6.6785E−08 | C21 | 8.6676E−05 | C21 | 0.0000E+00 |
| C22 | 2.9634E−08 | C22 | 2.9634E−08 | C22 | 1.5070E−08 | C22 | −3.3344E−06 | C22 | 0.0000E+00 |
| C23 | 0.0000E+00 | C23 | 0.0000E+00 | C23 | 0.0000E+00 | C23 | 0.0000E+00 | C23 | 0.0000E+00 |
| C24 | −1.8255E−09 | C24 | −1.8255E−09 | C24 | 1.0446E−08 | C24 | −5.5260E−06 | C24 | 0.0000E+00 |
| C25 | 0.0000E+00 | C25 | 0.0000E+00 | C25 | 0.0000E+00 | C25 | 0.0000E+00 | C25 | 0.0000E+00 |
| C26 | 8.2661E−08 | C26 | 8.2661E−08 | C26 | −1.6226E−08 | C26 | −3.2223E−06 | C26 | 0.0000E+00 |

TABLE 5-continued

| | 403B | | 402A | | 402B | | 402C | | 407B |
|---|---|---|---|---|---|---|---|---|---|
| C27 | 0.0000E+00 | C27 | 0.0000E+00 | C27 | 0.0000E+00 | C27 | 0.0000E+00 | C27 | 0.0000E+00 |
| C28 | −1.3883E−08 | C28 | −1.3883E−08 | C28 | 4.3950E−09 | C28 | −2.7570E−06 | C28 | 0.0000E+00 |
| C29 | 0.0000E+00 | C29 | 0.0000E+00 | C29 | 0.0000E+00 | C29 | 0.0000E+00 | C29 | 0.0000E+00 |
| C30 | 2.7065E−09 | C30 | 2.7065E−09 | C30 | 0.0000E+00 | C30 | −9.0754E−08 | C30 | 0.0000E+00 |
| C31 | 0.0000E+00 | C31 | 0.0000E+00 | C31 | 0.0000E+00 | C31 | 0.0000E+00 | C31 | 0.0000E+00 |
| C32 | −1.7017E−09 | C32 | −1.7017E−09 | C32 | 0.0000E+00 | C32 | −1.9220E−07 | C32 | 0.0000E+00 |
| C33 | 0.0000E+00 | C33 | 0.0000E+00 | C33 | 0.0000E+00 | C33 | 0.0000E+00 | C33 | 0.0000E+00 |
| C34 | 2.2638E−09 | C34 | 2.2638E−09 | C34 | 0.0000E+00 | C34 | −1.0587E−06 | C34 | 0.0000E+00 |
| C35 | 0.0000E+00 | C35 | 0.0000E+00 | C35 | 0.0000E+00 | C35 | 0.0000E+00 | C35 | 0.0000E+00 |
| C36 | −1.3808E−10 | C36 | −1.3808E−10 | C36 | 0.0000E+00 | C36 | −4.8872E−07 | C36 | 0.0000E+00 |
| C37 | 0.0000E+00 | C37 | 0.0000E+00 | C37 | 0.0000E+00 | C37 | 1.3990E−08 | C37 | 0.0000E+00 |
| C38 | 0.0000E+00 | C38 | 0.0000E+00 | C38 | 0.0000E+00 | C38 | 0.0000E+00 | C38 | 0.0000E+00 |
| C39 | 0.0000E+00 | C39 | 0.0000E+00 | C39 | 0.0000E+00 | C39 | 2.4800E−08 | C39 | 0.0000E+00 |
| C40 | 0.0000E+00 | C40 | 0.0000E+00 | C40 | 0.0000E+00 | C40 | 0.0000E+00 | C40 | 0.0000E+00 |
| C41 | 0.0000E+00 | C41 | 0.0000E+00 | C41 | 0.0000E+00 | C41 | 2.2847E−08 | C41 | 0.0000E+00 |
| C42 | 0.0000E+00 | C42 | 0.0000E+00 | C42 | 0.0000E+00 | C42 | 0.0000E+00 | C42 | 0.0000E+00 |
| C43 | 0.0000E+00 | C43 | 0.0000E+00 | C43 | 0.0000E+00 | C43 | 1.0083E−07 | C43 | 0.0000E+00 |
| C44 | 0.0000E+00 | C44 | 0.0000E+00 | C44 | 0.0000E+00 | C44 | 0.0000E+00 | C44 | 0.0000E+00 |
| C45 | 0.0000E+00 | C45 | 0.0000E+00 | C45 | 0.0000E+00 | C45 | 1.2997E−08 | C45 | 0.0000E+00 |

TABLE 6

| | | | |
|---|---|---|---|
| $n_n$ | | 1.8467 | |
| $n_m$ | | 1.5311 | |
| $\varphi_n/\varphi_A$ | −0.17 | $\varphi_n = -0.0123, \varphi_A = 0.0742$ | |
| $R_B/R_P$ | −3.68 | $R_B = -47.6, R_P = 12.9$ | |
| $(n_n-1)/(n_o-1)$ | 1.59 | $n_o = 1.5311$ | |
| α1−α2 | | 0.0 | |
| $\varphi_p\nu_n/\varphi_n\nu_p$ | −4.17 | $\varphi_p = 0.0631$ | |

Numerical Example 3

Figure 17:
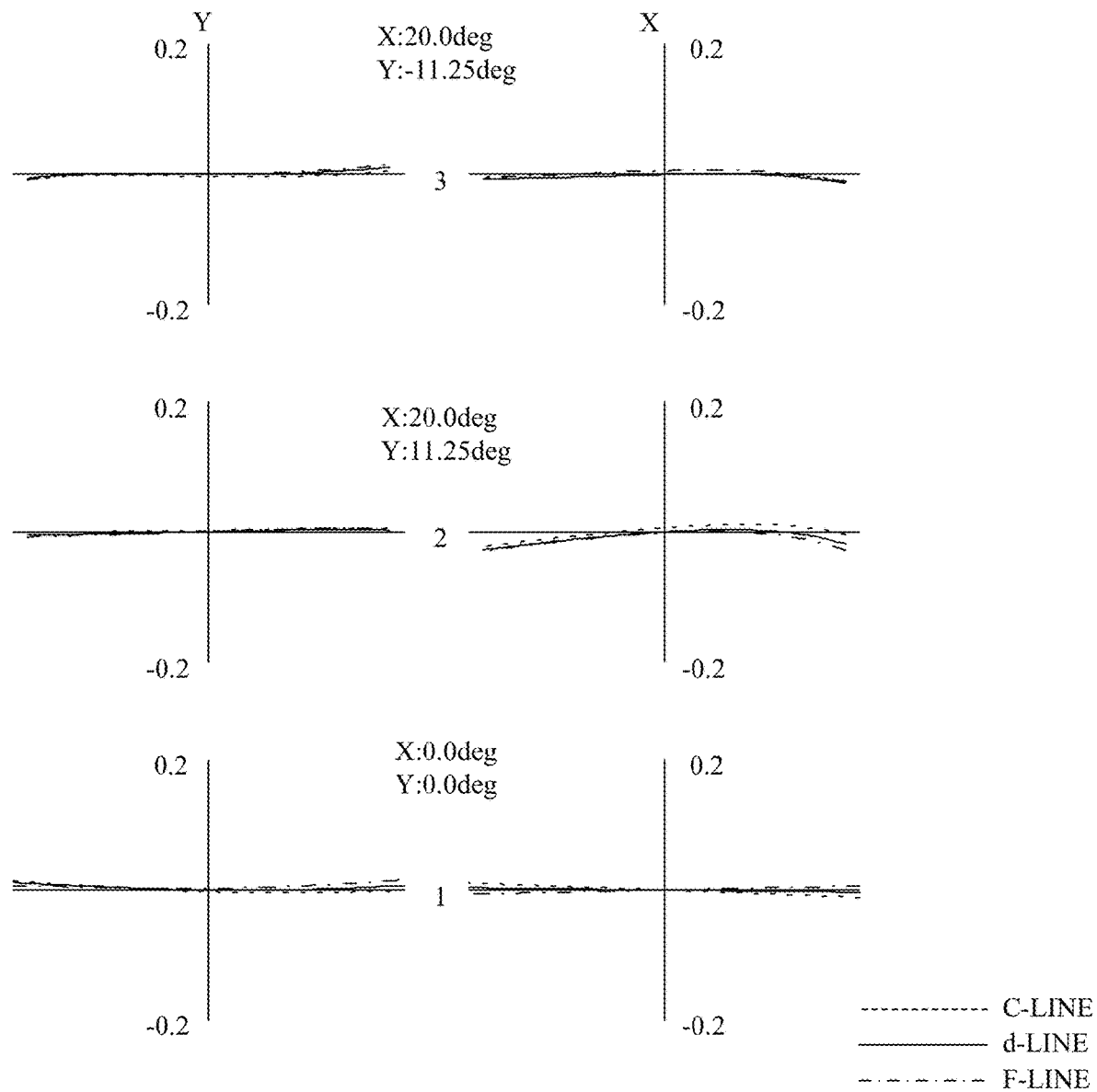
FIG. 17 is a lateral aberration diagram of an eyepiece optical system according to the Numerical Example 3.

A horizontal angle of view in a direction perpendicular to a plane of a figure is +20.5 degrees, a vertical angle of view in a direction parallel to the plane of the figure is +11.25 degrees, and a pupil diameter is 4 mm. Each surface number corresponds to that illustrated in FIG. 16. FIG. 16 illustrates the same optical system as in FIG. 7. Table 7 indicates a position of a local origin on each surface in an optical path via which an image from a display element is observed. Table 8 indicates coefficients of non-rotational symmetry surfaces. Table 9 indicates values of various conditions. FIG. 17 is a lateral aberration diagram of an eyepiece optical system according to this numerical example.

TABLE 7

| Type | Sur. No. | Tg | Zg | θ g | Rx | Ry | D | Nd | Vd |
|---|---|---|---|---|---|---|---|---|---|
| SPH | | 0.000 | 0.000 | 0.000 | −3000.000 | −3000.000 | −3000.000 | | |
| SPH | S | | | | 0.000 | 0.000 | 0.000 | | |
| SPH | 703A | 0.000 | 25.000 | 8.000 | −35.000 | −35.000 | 0.500 | 2.0027 | 19.32 |
| SPH | 703B | | | | −55.000 | −55.000 | 0.000 | 1.5311 | 55.75 |
| XYP | 702A | −2.266 | 25.846 | −23.166 | 0.000 | 0.000 | 0.000 | 1.5311 | 55.75 |
| XYP-M | 702B | 1.731 | 33.526 | 0.312 | −104.109 | −104.109 | 0.000 | 1.5311 | 55.75 |
| XYP-M | 702A | −2.266 | 25.846 | −23.166 | 0.000 | 0.000 | 0.000 | 1.5311 | 55.75 |
| XYP | 702C | 12.173 | 34.999 | 53.292 | 0.000 | 0.000 | 0.000 | | |
| SPH | 705A | 19.671 | 34.317 | 42.779 | 0.000 | 0.000 | 0.700 | 1.5163 | 64.14 |
| SPH | 705B | | | | 0.000 | 0.000 | 0.500 | | |
| SPH | 705C | | | | 0.000 | 0.000 | 0.000 | | |

TABLE 8

| | 702A | | 702B | | 702C |
|---|---|---|---|---|---|
| K | 0.0000E+00 | K | −2.1921E+00 | K | 0.0000E+00 |
| C2 | 0.0000E+00 | C2 | 0.0000E+00 | C2 | 0.0000E+00 |
| C3 | −6.0997E−01 | C3 | 3.0996E−01 | C3 | 0.0000E+00 |
| C4 | −6.1302E−03 | C4 | −8.1367E−03 | C4 | −2.4070E−02 |
| C5 | 0.0000E+00 | C5 | 0.0000E+00 | C5 | 0.0000E+00 |
| C6 | 5.9747E−03 | C6 | −6.0441E−03 | C6 | 6.4860E−04 |
| C7 | 0.0000E+00 | C7 | 0.0000E+00 | C7 | 0.0000E+00 |
| C8 | −3.4577E−05 | C8 | 1.3624E−04 | C8 | −4.7216E−04 |
| C9 | 0.0000E+00 | C9 | 0.0000E+00 | C9 | 0.0000E+00 |
| C10 | −2.7614E−04 | C10 | −3.9066E−05 | C10 | −2.3047E−03 |
| C11 | 4.0868E−06 | C11 | 2.6279E−07 | C11 | 1.8538E−05 |
| C12 | 0.0000E+00 | C12 | 0.0000E+00 | C12 | 0.0000E+00 |
| C13 | −2.3212E−05 | C13 | 4.4513E−06 | C13 | −1.3970E−04 |
| C14 | 0.0000E+00 | C14 | 0.0000E+00 | C14 | 0.0000E+00 |
| C15 | −1.4307E−05 | C15 | 4.2805E−06 | C15 | 2.1259E−05 |
| C16 | 0.0000E+00 | C16 | 0.0000E+00 | C16 | 0.0000E+00 |
| C17 | 1.5347E−07 | C17 | −1.9732E−07 | C17 | 5.4640E−06 |
| C18 | 0.0000E+00 | C18 | 0.0000E+00 | C18 | 0.0000E+00 |
| C19 | 6.2888E−07 | C19 | −3.7868E−07 | C19 | 3.1147E−05 |
| C20 | 0.0000E+00 | C20 | 0.0000E+00 | C20 | 0.0000E+00 |
| C21 | 1.4056E−06 | C21 | −3.3302E−07 | C21 | 8.6216E−06 |
| C22 | 2.2884E−08 | C22 | 2.6845E−09 | C22 | −2.0647E−08 |
| C23 | 0.0000E+00 | C23 | 0.0000E+00 | C23 | 0.0000E+00 |
| C24 | −5.0510E−08 | C24 | −4.5125E−09 | C24 | −7.8014E−07 |
| C25 | 0.0000E+00 | C25 | 0.0000E+00 | C25 | 0.0000E+00 |
| C26 | 6.0336E−08 | C26 | −3.4762E−08 | C26 | −8.1363E−07 |
| C27 | 0.0000E+00 | C27 | 0.0000E+00 | C27 | 0.0000E+00 |
| C28 | −5.8068E−08 | C28 | 4.0621E−08 | C28 | −4.7779E−07 |
| C29 | 0.0000E+00 | C29 | 0.0000E+00 | C29 | 0.0000E+00 |
| C30 | 0.0000E+00 | C30 | −7.6669E−10 | C30 | 0.0000E+00 |

TABLE 8-continued

| | 702A | | 702B | | 702C |
|---|---|---|---|---|---|
| C31 | 0.0000E+00 | C31 | 0.0000E+00 | C31 | 0.0000E+00 |
| C32 | 0.0000E+00 | C32 | 2.0747E−09 | C32 | 0.0000E+00 |
| C33 | 0.0000E+00 | C33 | 0.0000E+00 | C33 | 0.0000E+00 |
| C34 | 0.0000E+00 | C34 | 2.0137E−09 | C34 | 0.0000E+00 |
| C35 | 0.0000E+00 | C35 | 0.0000E+00 | C35 | 0.0000E+00 |
| C36 | 0.0000E+00 | C36 | 9.0046E−11 | C36 | 0.0000E+00 |
| C37 | 0.0000E+00 | C37 | 2.9457E−11 | C37 | 0.0000E+00 |
| C38 | 0.0000E+00 | C38 | 0.0000E+00 | C38 | 0.0000E+00 |
| C39 | 0.0000E+00 | C39 | 5.2402E−11 | C39 | 0.0000E+00 |
| C40 | 0.0000E+00 | C40 | 0.0000E+00 | C40 | 0.0000E+00 |
| C41 | 0.0000E+00 | C41 | 8.6344E−12 | C41 | 0.0000E+00 |
| C42 | 0.0000E+00 | C42 | 0.0000E+00 | C42 | 0.0000E+00 |
| C43 | 0.0000E+00 | C43 | 4.3095E−11 | C43 | 0.0000E+00 |
| C44 | 0.0000E+00 | C44 | 0.0000E+00 | C44 | 0.0000E+00 |
| C45 | 0.0000E+00 | C45 | −1.4878E−10 | C45 | 0.0000E+00 |

TABLE 9

| | | | |
|---|---|---|---|
| $n_n$ | | 2.0027 | |
| $n_m$ | | 1.5311 | |
| $\varphi_n/\varphi_A$ | −0.12 | $\varphi_n = -0.0072, \varphi_A = 0.0617$ | |

TABLE 9-continued

| | | | |
|---|---|---|---|
| $R_{AX}/R_{MX}$ | 0.72 | $R_{AX} = -48.8, R_{MX} = -67.7$ | |
| $L_{PB}/fL$ | 0.49 | $L_{PB} = 8.0, fL = 16.2$ | |
| $|\alpha 1-\alpha 3|$ | | 1.6 | |

Numerical Example 4

Figure 19:
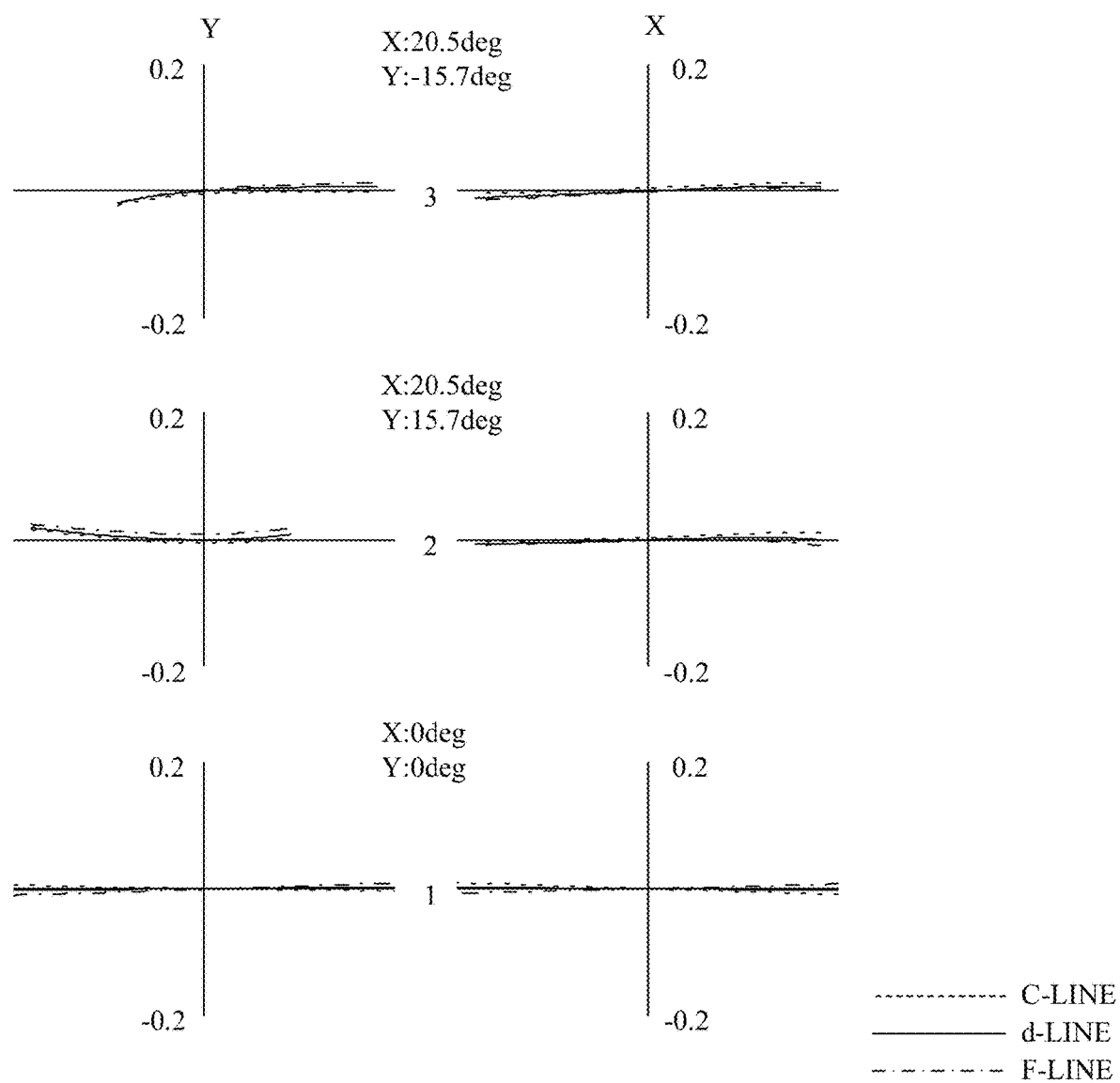
FIG. 19 is a lateral aberration diagram of an eyepiece optical system according to the Numerical Example 4.

A horizontal angle of view in a direction perpendicular to a plane of a figure is +20.5 degrees, a vertical angle of view in a direction parallel to the plane of the figure is +15.56 degrees, and a pupil diameter is 4 mm. Each surface number corresponds to that illustrated in FIG. 18. FIG. 18 illustrates the same optical system as in FIG. 8. Table 10A indicates a position of a local origin on each surface in an optical path via which an image from a display element is observed, and Table 10B indicates a position of a local origin on each surface in an optical path via which outside is observed. Table 11 indicates coefficients of non-rotational symmetry surfaces and coefficients of toroidal surfaces. Table 12 indicates values of various conditions. FIG. 19 is a lateral aberration diagram of an eyepiece optical system according to this numerical example.

TABLE 10A

| Type | Sur. No. | Yg | Zg | θ g | Rx | Ry | D | Nd | Vd |
|---|---|---|---|---|---|---|---|---|---|
| SPH | | 0.000 | 0.000 | 0.000 | −3000.000 | −3000.000 | −3000.000 | | |
| SPH | S | | | | 0.000 | 0.000 | 0.000 | | |
| SPH | 803A | | 25.000 | 8.000 | −40.000 | −40.000 | 0.500 | 2.0027 | 19.32 |
| SPH | 803B | | | | −67.796 | −67.796 | 0.000 | 1.5311 | 55.75 |
| XYP | 802A | 2.174 | 25.193 | −19.872 | 0.000 | 0.000 | 0.000 | | |
| XYP-M | 802B | −2.010 | 32.668 | 3.138 | −95.176 | −95.176 | 0.000 | 1.5311 | 55.75 |
| XYP-M | 802A | 2.174 | 25.193 | −19.872 | 0.000 | 0.000 | 0.000 | 1.5311 | 55.75 |
| XYP | 802C | 13.985 | 32.685 | 53.948 | 0.000 | 0.000 | 0.000 | 1.5311 | 55.75 |
| XTO | 805A | 14.165 | 32.611 | 55.473 | 15.515 | 22.512 | 5.013 | | |
| SPH | 805B | | | | −9.41E+11 | −9.41E+11 | 0.000 | 1.9996 | 29.22 |
| SPH | 804A | 20.616 | 32.278 | 55.473 | 0.000 | 0.000 | 0.700 | 1.5163 | 64.14 |
| SPH | 804B | | | | 0.000 | 0.000 | 0.500 | | |
| SPH | 804C | | | | 0.000 | 0.000 | 0.000 | | |

TABLE 10B

| Type | Sur. No. | Yg | Zg | θ g | Rx | Ry | D | Nd | Vd |
|---|---|---|---|---|---|---|---|---|---|
| SPH | | 0.000 | 0.000 | 0.000 | −1400.000 | −1400.000 | 1400.000 | | |
| SPH | S | | | | 0.000 | 0.000 | 0.000 | | |
| SPH | 803A | | 25.000 | 8.000 | −69.858 | −69.858 | 0.500 | 1.8467 | 23.78 |
| SPH | 803B | | | | 0.000 | 0.000 | 0.000 | 1.5311 | 55.75 |
| XYP | 802A | 2.174 | 25.193 | −19.872 | 0.000 | 0.000 | 0.000 | | |
| XYP | 802B | −2.010 | 32.668 | 3.138 | 0.000 | 0.000 | 0.000 | 1.5311 | 55.75 |
| ASP | 806B | −1.406 | 40.857 | 8.000 | −49.077 | −49.077 | 0.000 | | |

TABLE 11

| | 802A | | 802B | | 802C | | 806B |
|---|---|---|---|---|---|---|---|
| K | 0.0000E+00 | K | 1.3120E+01 | K | 0.0000E+00 | K | 0.0000 |
| C2 | 0.0000E+00 | C2 | 0.0000E+00 | C2 | 0.0000E+00 | C2 | 0.0000E+00 |
| C3 | −5.7459E−01 | C3 | 4.5137E−01 | C3 | 0.0000E+00 | C3 | 0.0000E+00 |
| C4 | −8.3248E−03 | C4 | −9.6607E−03 | C4 | −1.0885E−02 | C4 | 0.0000E+00 |
| C5 | 0.0000E+00 | C5 | 0.0000E+00 | C5 | 0.0000E+00 | C5 | 0.0000E+00 |
| C6 | 3.0100E−03 | C6 | −5.0856E−03 | C6 | 2.5229E−03 | C6 | 0.0000E+00 |
| C7 | 0.0000E+00 | C7 | 0.0000E+00 | C7 | 0.0000E+00 | C7 | 0.0000E+00 |
| C8 | −4.5160E−04 | C8 | −2.6304E−05 | C8 | −3.1000E−03 | C8 | 0.0000E+00 |
| C9 | 0.0000E+00 | C9 | 0.0000E+00 | C9 | 0.0000E+00 | C9 | 0.0000E+00 |
| C10 | −2.9600E−05 | C10 | −7.6696E−05 | C10 | −1.6224E−03 | C10 | 0.0000E+00 |
| C11 | 7.4263E−06 | C11 | 2.8155E−06 | C11 | 7.1892E−05 | C11 | 0.0000E+00 |
| C12 | 0.0000E+00 | C12 | 0.0000E+00 | C12 | 0.0000E+00 | C12 | 0.0000E+00 |
| C13 | −2.5930E−05 | C13 | 2.8456E−06 | C13 | 1.6052E−04 | C13 | 0.0000E+00 |

TABLE 11-continued

| | 802A | | 802B | | 802C | | 806B |
|---|---|---|---|---|---|---|---|
| C14 | 0.0000E+00 | C14 | 0.0000E+00 | C14 | 0.0000E+00 | C14 | 0.0000E+00 |
| C15 | 1.6882E−06 | C15 | 1.5274E−06 | C15 | 1.0126E−05 | C15 | 0.0000E+00 |
| C16 | 0.0000E+00 | C16 | 0.0000E+00 | C16 | 0.0000E+00 | C16 | 0.0000E+00 |
| C17 | −3.6845E−07 | C17 | −1.2275E−07 | C17 | 0.0000E+00 | C17 | 0.0000E+00 |
| C18 | 0.0000E+00 | C18 | 0.0000E+00 | C18 | 0.0000E+00 | C18 | 0.0000E+00 |
| C19 | −1.4116E−06 | C19 | 2.9351E−07 | C19 | 0.0000E+00 | C19 | 0.0000E+00 |
| C20 | 0.0000E+00 | C20 | 0.0000E+00 | C20 | 0.0000E+00 | C20 | 0.0000E+00 |
| C21 | −7.9349E−07 | C21 | −3.9464E−07 | C21 | 0.0000E+00 | C21 | 0.0000E+00 |
| C22 | −4.0877E−09 | C22 | 1.9036E−09 | C22 | 0.0000E+00 | C22 | 0.0000E+00 |
| C23 | 0.0000E+00 | C23 | 0.0000E+00 | C23 | 0.0000E+00 | C23 | 0.0000E+00 |
| C24 | −1.7200E−08 | C24 | 6.7643E−09 | C24 | 0.0000E+00 | C24 | 0.0000E+00 |
| C25 | 0.0000E+00 | C25 | 0.0000E+00 | C25 | 0.0000E+00 | C25 | 0.0000E+00 |
| C26 | −5.0699E−08 | C26 | 3.6959E−08 | C26 | 0.0000E+00 | C26 | 0.0000E+00 |
| C27 | 0.0000E+00 | C27 | 0.0000E+00 | C27 | 0.0000E+00 | C27 | 0.0000E+00 |
| C28 | −1.0184E−08 | C28 | 1.0855E−07 | C28 | 0.0000E+00 | C28 | 0.0000E+00 |
| C29 | 0.0000E+00 | C29 | 0.0000E+00 | C29 | 0.0000E+00 | C29 | 0.0000E+00 |
| C30 | 0.0000E+00 | C30 | −6.5176E−10 | C30 | 0.0000E+00 | C30 | 0.0000E+00 |
| C31 | 0.0000E+00 | C31 | 0.0000E+00 | C31 | 0.0000E+00 | C31 | 0.0000E+00 |
| C32 | 0.0000E+00 | C32 | −1.9700E−09 | C32 | 0.0000E+00 | C32 | 0.0000E+00 |
| C33 | 0.0000E+00 | C33 | 0.0000E+00 | C33 | 0.0000E+00 | C33 | 0.0000E+00 |
| C34 | 0.0000E+00 | C34 | −5.7573E−09 | C34 | 0.0000E+00 | C34 | 0.0000E+00 |
| C35 | 0.0000E+00 | C35 | 0.0000E+00 | C35 | 0.0000E+00 | C35 | 0.0000E+00 |
| C36 | 0.0000E+00 | C36 | −7.2204E−09 | C36 | 0.0000E+00 | C36 | 0.0000E+00 |
| C37 | 0.0000E+00 | C37 | 1.0088E−11 | C37 | 0.0000E+00 | C37 | 0.0000E+00 |
| C38 | 0.0000E+00 | C38 | 0.0000E+00 | C38 | 0.0000E+00 | C38 | 0.0000E+00 |
| C39 | 0.0000E+00 | C39 | 5.4876E−11 | C39 | 0.0000E+00 | C39 | 0.0000E+00 |
| C40 | 0.0000E+00 | C40 | 0.0000E+00 | C40 | 0.0000E+00 | C40 | 0.0000E+00 |
| C41 | 0.0000E+00 | C41 | 1.2045E−10 | C41 | 0.0000E+00 | C41 | 0.0000E+00 |
| C42 | 0.0000E+00 | C42 | 0.0000E+00 | C42 | 0.0000E+00 | C42 | 0.0000E+00 |
| C43 | 0.0000E+00 | C43 | 1.9469E−10 | C43 | 0.0000E+00 | C43 | 0.0000E+00 |
| C44 | 0.0000E+00 | C44 | 0.0000E+00 | C44 | 0.0000E+00 | C44 | 0.0000E+00 |
| C45 | 0.0000E+00 | C45 | 1.6294E−10 | C45 | 0.0000E+00 | C45 | 0.0000E+00 |

TABLE 12

| $n_n$ | | 2.0027 | |
| $n_m$ | | 1.5311 | |
| $\varphi_n/\varphi_A$ | −0.14 | $\varphi_n = -0.0102, \varphi_A = 0.0741$ | |
| $R_B/R_P$ | −2.05 | $R_B = 46.0, R_P = 22.5$ | |
| $\varphi_p V_n/\varphi_n V_p$ | −4.09 | $\varphi_p = 0.0631, \varphi_n = -0.0102$ | |
| $|\alpha1-\alpha3|$ | | 1.7 | |
| $R_{AX}/R_{MX}$ | 0.91 | $R_{AX} = -61.3, R_{MX} = -67.8$ | |
| $L_{PB}/fL$ | 0.59 | $L_{PB} = 8.0, fL = 13.5$ | |

According to each embodiment, it is possible to provide an optical system and a display apparatus each of which is small and has a wide angle of view.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-208642, filed on Dec. 16, 2020 which is hereby incorporated by reference herein in its entirety.

What is claimed is:

1. An optical system which guides a light beam from a display element to an exit pupil, the optical system comprising:
    a first optical element including a transmission surface, a reflection-transmission surface, and a reflection surface;
    a positive lens disposed between the first optical element and the display element; and
    a negative lens including a concave surface on an exit pupil side,
    wherein the light beam from the display element heads toward the exit pupil via the positive lens, the transmission surface, the reflection-transmission surface, the reflection surface, the reflection-transmission surface, and the negative lens in this order, and
    wherein the following inequalities are satisfied:

$$n_n > n_m$$

$$\varphi_n/\varphi_A < -0.05$$

$$\varphi_p V_n/\varphi_n V_p < -2$$

where $n_n$ represents a refractive index of the negative lens at a d-line, $n_m$ represents a refractive index of the first optical element at the d-line, $\varphi_n$ represents an optical power of the negative lens, $\varphi_A$ represents an entire optical power of the optical system, $\varphi_p$ represents an optical power of the positive lens, $V_p$ represents an Abbe number of the positive lens, and $V_n$ represents an Abbe number of the negative lens.

2. The optical system according to claim 1, wherein the following inequality is satisfied:

$$n_n/n_m > 1.05.$$

3. The optical system according to claim 1, wherein the following inequality is satisfied:

$$15 < V_n < V_m$$

where $V_n$ represents an Abbe number of the negative lens, and $V_m$ represents an Abbe number of the first optical element.

4. The optical system according to claim 1, wherein the positive lens has a convex surface facing the first optical element, and
    wherein the following inequality is satisfied:

$$-8.0 < R_B/R_P < -2.0$$

where $R_B$ represents a curvature radius of the reflection surface at an intersection with a principal ray of a central angle-of-view light beam, and $R_P$ represents a curvature radius of the convex surface.

5. The optical system according to claim 1, wherein the positive lens has a convex surface facing the first optical element, and
wherein the following inequality is satisfied:

$$R_{PX} < R_{PY}$$

where $R_{PY}$ represents a curvature radius of the convex surface in a first cross section including a principal ray of a central angle-of-view light beam from the display element to the exit pupil, and $R_{PX}$ represents a curvature radius of the convex surface in a second cross section including the principal ray and orthogonal to the first cross section.

6. The optical system according to claim 5, wherein when a direction orthogonal to a plane on which the exit pupil is formed is a first direction, inside the positive lens, a length of an optical path of a light beam that passes through a position closest to the reflection surface in the first direction is longer than a length of an optical path of a light beam that passes through a position closest to the reflection-transmission surface in the first direction.

7. The optical system according to claim 1, further comprising a third optical element disposed on a side of opposite to the negative lens with respect to the first optical element.

8. The optical system according to claim 1, wherein the following inequality is satisfied:

$$L_{PB}/fL < 0.75$$

where, $L_{PB}$ represents a distance on the Z axis between an exit surface of the negative lens on a principal ray of a central angle of view and the reflection surface, and fL represents a focal length of the optical system.

9. The optical system according to claim 1, wherein the following inequality is satisfied:

$$|\alpha 1 - \alpha 3| < 5$$

where, $\alpha 1$ represents an angle formed by the principal ray of a central angle of view and a normal of the reflection-transmission surface at a position where the principal ray is transmitted, and $\alpha 3$ represents an angle formed by the principal ray and an optical axis of the negative lens.

10. The optical system according to claim 1, wherein the negative lens is a meniscus lens having a convex surface, and
wherein the following inequality is satisfied:

$$0.3 < R_{AX}/R_{MX} < 2.0$$

where $R_{MX}$ represents a curvature radius of the convex surface of the negative lens in a cross section orthogonal to a cross section including a principal ray of a central angle-of-view, and $R_{AX}$ represents a curvature radius of the reflection-transmission surface at a position where the principal ray is transmitted in the cross section orthogonal to the cross section including the principal ray.

11. The optical system according to claim 1, wherein the negative lens is made of glass material.

12. A display apparatus comprising:
the optical system according to claim 1; and
a display element.

13. An optical system which guides a light beam from a display element to an exit pupil, the optical system comprising:
a first optical element including a first transmission surface, a reflection-transmission surface, and a reflection surface;
a negative lens including a concae surface on an exit pupil side; and
a second optical element which is a prism disposed between the first optical element and the negative lens,
wherein the light beam from the display element heads toward the exit pupil via the first transmission surface, the reflection-transmission surface, the reflection surface, the reflection-transmission surface, and the negative lens in this order, and
wherein the following inequalities are satisfied:

$$n_n > n_m$$

$$(n_n - 1)/(n_o - 1) > 1.3$$

where $n_n$ represents a refractive index of the negative lens at a d-line, $n_m$ represents a refractive index of the first optical element at the d-line, and $n_o$ represents a refractive index of the second optical element at the d-line.

14. The optical system according to claim 13, wherein a surface of the second optical element on a display element side has a same shape as the reflection-transmission surface.

15. The optical system according to claim 14, wherein the second optical element includes a second transmission surface opposite to the reflection-transmission surface, and
wherein the following inequality is satisfied:

$$|\alpha 1 - \alpha 2| < 5$$

where, $\alpha 1$ represents an angle formed by a principal ray of a central angle of view and a normal of the reflection-transmission surface at a position where the principal ray is transmitted, and $\alpha 2$ represents an angle formed by the principal ray and a normal of the second transmission surface at a position where the principal ray is transmitted.

16. The optical system according to claim 14, wherein the following inequality is satisfied:

$$n_n > n_o.$$

* * * * *